(12) United States Patent
Mansoor

(10) Patent No.: US 12,292,937 B2
(45) Date of Patent: May 6, 2025

(54) COGNITIVE AUTOMATION PLATFORM

(71) Applicant: Aera Technology, Inc., Mountain View, CA (US)

(72) Inventor: Shariq Mansoor, Mountain View, CA (US)

(73) Assignee: Aera Technology, Inc., Mountain View, CA (US)

( * ) Notice: Subject to any disclaimer, the term of this patent is extended or adjusted under 35 U.S.C. 154(b) by 0 days.

(21) Appl. No.: 17/460,018

(22) Filed: Aug. 27, 2021

(65) Prior Publication Data

US 2022/0067109 A1 Mar. 3, 2022

Related U.S. Application Data

(60) Provisional application No. 63/071,950, filed on Aug. 28, 2020.

(51) Int. Cl.
| | |
|---|---|
| G06F 16/951 | (2019.01) |
| G06F 16/23 | (2019.01) |
| G06F 16/9535 | (2019.01) |
| G06F 16/9538 | (2019.01) |
| G06F 21/60 | (2013.01) |

(Continued)

(52) U.S. Cl.
CPC ........ G06F 16/951 (2019.01); G06F 16/2308 (2019.01); G06F 16/2358 (2019.01); G06F 16/9535 (2019.01); G06F 16/9538 (2019.01); G06F 21/602 (2013.01); G06N 5/022 (2013.01); G06N 7/023 (2013.01); G06N 7/026 (2013.01)

(58) Field of Classification Search
CPC ............... G06F 16/951; G06F 16/2308; G06F 16/2358; G06F 16/9535; G06F 16/9538; G06F 21/602; G06F 21/57; G06F 21/554; G06N 5/022; G06N 7/023; G06N 7/026; G06N 3/045; G06N 5/01; G06N 5/048
USPC ................ 707/709, 710, 722, 741, 769, 780
See application file for complete search history.

(56) References Cited

U.S. PATENT DOCUMENTS

| | | | |
|---|---|---|---|
| 6,182,085 B1 * | 1/2001 | Eichstaedt | G06F 16/951 707/999.102 |
| 7,194,679 B1 * | 3/2007 | Green | G06F 40/166 707/E17.116 |

(Continued)

*Primary Examiner* — Phong H Nguyen
(74) *Attorney, Agent, or Firm* — Perkins Coie LLP

(57) ABSTRACT

Techniques for a network-accessible cognitive automation platform for a self-driving application are provided. The platform includes a cognitive operating system, which includes a data crawler configured to discover and extract data stored in internal systems and external third-party systems, a data processing engine configured to cleanse, correlate, link, etc., transactional and unstructured data, and a cognitive data layer (CDL) configured to process the transformed crawled data with various models and algorithmic libraries of metrics, trends, and metadata to identify a root cause of an issue and prescribe actions to mitigate or overcome risks related to the issue. A cognitive development kit is configured to build a specific skill application on top of the cognitive operating system, the specific skill application generating recommendations, actions, and predictions. A search processor and GUI are configured to perform a search request of the data in the CDL and display the results in the GUI.

20 Claims, 20 Drawing Sheets

(51) Int. Cl.
*G06N 5/022* (2023.01)
*G06N 7/02* (2006.01)

(56) References Cited

U.S. PATENT DOCUMENTS

| | | | | |
|---|---|---|---|---|
| 8,972,376 | B1* | 3/2015 | Gailis | G06F 16/951 |
| | | | | 706/14 |
| 9,514,175 | B2* | 12/2016 | Swan | G06F 16/951 |
| 10,693,898 | B2* | 6/2020 | Iliofotou | H04L 63/1433 |
| 10,764,150 | B1* | 9/2020 | Hermoni | G06F 11/3006 |
| 2002/0138509 | A1* | 9/2002 | Burrows | G06F 16/951 |
| | | | | 715/255 |
| 2005/0114225 | A1* | 5/2005 | Longman | G06Q 30/08 |
| | | | | 705/26.3 |
| 2007/0016615 | A1* | 1/2007 | Mohan | G06F 8/20 |
| | | | | 707/999.107 |
| 2008/0005024 | A1* | 1/2008 | Kirkwood | G06Q 10/00 |
| | | | | 705/50 |
| 2012/0180073 | A1* | 7/2012 | Hung | G06F 16/9566 |
| | | | | 715/234 |
| 2013/0268552 | A1* | 10/2013 | Platt | G06F 21/6218 |
| | | | | 707/769 |
| 2014/0101572 | A1* | 4/2014 | Gunderson | G06F 3/0481 |
| | | | | 715/758 |
| 2015/0039512 | A1* | 2/2015 | Adjaoute | G06Q 20/384 |
| | | | | 705/44 |
| 2015/0161257 | A1* | 6/2015 | Shivaswamy | G06F 16/951 |
| | | | | 707/709 |
| 2017/0078137 | A1* | 3/2017 | Spiegl | G06F 11/3006 |
| 2017/0132553 | A1* | 5/2017 | Theirl | G06F 16/2246 |
| 2017/0237824 | A1* | 8/2017 | Vignali | H04L 67/01 |
| | | | | 709/203 |
| 2018/0121029 | A1* | 5/2018 | Mrad | G06F 40/186 |
| 2018/0300763 | A1* | 10/2018 | Hoang | G06F 16/951 |

* cited by examiner

FIG. 3D

Aera  Customer 5500004

At a glance   Reports (3)

Customer 5500004

| INVOICE AMOUNT | LATE PAYMENT AMT | NET AMOUNT | CASH DISCOUNT AMT | ON-TIME, IN-FULL PCT |
|---|---|---|---|---|
| $902.68K | $2.07M | $902.40K | -$64.20K | 63.96% |

TOP PLANTS

Plant name: Katrinatown, Johntown, Ianborough, West John, Port Jose
Top 5 SUM Order Amt (0, 10,000, 20,000, 30,000, 40,000, 50,000)

TOP PARTS

Part Description: Material 1049335, Material 1052238, Material 1015609, Material 1114553, Material 1059958
Top 5 SUM Order Amt (0, 10,000, 20,000, 30,000, 40,000, 50,000)

Knowledge graph

[V] Vendor 921560   [P] Katrinatown
Customer 5500004
[Pr] Material 1052238

Top supplier by revenue
Vendor 921560

Key Delivery Locations
Katrinatown

Key Products Impacted
Material 1052238

Related results
We found 3 results

Customer Search Viewlet
Customer Search Viewlet
Created by Ryan Frisby   Modified Aug 4, 2017 at 11:00 am by Ryan Frisby

Customer Viewlet Measures - AR

Order Detail Report – Open Order
Sales Analysis    Add Subject Area

Filters  New ×

Default Filters  ⌄ ⊕

Transaction Detail.Item Rel for Delv equals X   × ⊝

Sales Document Category.Doc Category equals Order

Reject Reason equals Not Set

Order Qty greater than 0

Customer Requested Date.Date between 01 Jan 2016 and 31 Mar 2018   × ⊝

Sales Document Type.Document Type Code not equals S029, S032, S022, S009, S015, S019, S028, S031 or S013

Open Order Amt greater than 0

Part.Part Type not equals service   × ⊝

Distribution Channel.Channel Name not equals Inter-company   × ⊝

Company.Region not equals Not Set   × ⊝

⇗ Share ×

☆ Summary Table                       ☐ Filters  ↔ Columns  ⚙ Settings  ⓘ Details

| Country N... | Sales Org Code | Customer Name | SUM Open Confi... ↓ | SUM Open Order... | Late Orders Amt | UOM | Shipped OTIF Prct | % OTIF-AGID |
|---|---|---|---|---|---|---|---|---|
| China | 0023 | Customer 9067504 | 2,654,584.28 | 4,813,421.03 | 2,654,584.28 | Vial | 86.83% | 79.78% |
| Finland | 0044 | Customer 9024519 | 1,847,863.06 | 1,900,501.82 | 1,847,863.06 | Carton | 60.53% | 45.70% |
| USA | 0008 | Customer 9078593 | 1,555,560.00 | 1,558,729.92 | 1,555,560.00 | Vial | 12.50% | 100.00% |
| Finland | 0044 | Customer 9024519 | 633,900.56 | 816,230.73 | 633,900.56 | Vial | 65.22% | 55.56% |
| Russian Fed. | 0020 | Customer 9061515 | 402,862.44 | 739,301.53 | 402,862.44 | Vial | 32.56% | 10.34% |
| Finland | 0044 | Customer 9024519 | 343,149.82 | 343,149.82 | 343,149.82 | Bottle | 39.13% | 60.00% |
| Australia | 0037 | Customer 9082203 | 341,121.52 | 5,250,134.57 | 341,121.52 | Bottle | 45.72% | 35.73% |
| China | 0023 | Customer 9067504 | 327,238.99 | 327,238.99 | 327,238.99 | Carton | 88.85% | 90.69% |
| Finland | 0044 | Customer 9024519 | 317,600.81 | 317,600.81 | 317,600.81 | Tray | 60.00% | 66.67% |
| Russian Fed. | 0020 | Customer 9061515 | 225,597.74 | 225,597.74 | 225,597.74 | Bag | 32.16% | 0.00% |
| Finland | 0044 | Customer 9024519 | 209,415.41 | 657,396.28 | 209,415.41 | Tube | 19.05% | 33.33% |
| Australia | 0037 | Customer 9116025 | 157,008.77 | 4,158,345.26 | 157,008.77 | Bottle | 44.00% | 37.99% |
| China | 0023 | Customer 9067504 | 123,527.48 | 123,527.48 | 123,527.48 | Bottle | 89.94% | 94.08% |
| USA | 0008 | Customer 9033846 | 121,799.50 | 326,584.34 | 121,799.50 | Carton | 87.32% | 30.01% |
| Egypt | 0024 | Customer 9063649 | 120,000.00 | 120,000.00 | 120,000.00 | Drum | 66.67% | 50.00% |
| Turkey | 0024 | Customer 9022294 | 90,000.00 | 90,000.00 | 90,000.00 | Bag | 0.00% | 0.00% |
| Finland | 0044 | Customer 9024519 | 88,837.24 | 88,837.24 | 88,837.24 | Bag | 75.00% | 0.00% |
| Brazil | 0011 | Customer 9079147 | 83,616.18 | 93,624.28 | 83,616.18 | Bottle | 33.28% | 97.76% |

< 1 2 3 4 ... 236 >  Page: 1 ⌄   Result per page: 20 ⌄   4702 results

≡ Details | Summary Table | Open Order Amt Trends | Plant Region Open Order | Attribute Summary | Storage Condition | Material Group | Open Order Line Trend

COGNITIVE AUTOMATION PLATFORM

CROSS REFERENCE TO RELATED APPLICATIONS

This patent application claims priority from U.S. Provisional Patent Application Ser. No. 63/071,950, entitled "Cognitive Automation Platform for Enterprises," filed Aug. 28, 2020, the entirety of which is incorporated herein by this reference thereto.

TECHNICAL FIELD

The disclosure is related to a method and apparatus for a network-accessible cognitive automation platform.

BACKGROUND

Enterprises and other organizations use automation software for automating various tasks associated with running their business and operations. Current automation technologies mimic repetitive human tasks with more precision and accuracy by using software. Such automation technologies are ideal for those processes that do not require decision-making or human intervention. However, there are going to be plenty of situations that do require human decision-making, and when there is voluminous data involved, it can become very challenging for the human workforce or other human operated organizations (e.g., sports) to make the right decisions and the current automation technologies are not helpful in such situations.

Further, in large businesses or organizations with complex information technology (IT) landscape, decisions are made by people supported by systems and requires days or weeks to identify root causes and take actions. For example, in the current decision-making process, a user has to gather various reports, review exceptions, analyze the available data to identify available options, interact with various actors to get a complete picture of the scenario, such as a business scenario, run through a probable solution and analyze "what-if" situations, then finally take action in various systems, and then update the concerned entities all of which can take weeks if not months. Such a decision-making process can be ineffective as the decision-making is time-consuming, labor-intensive, and machine-computing extensive. Also, since the process takes a significantly long time, the chances of the data being obsolete by the time decisions are taken is likely high. Further, the business or organization can also miss "in-the-moment" opportunities to improve financial and/or operation performance because the decision-making process is time-consuming, labor-intensive, and machine-computing extensive.

SUMMARY

Techniques for a network-accessible cognitive automation platform for a self-driving application are provided. The platform includes a cognitive operating system, which includes a data crawler configured to discover and extract data stored in internal systems and external third-party systems, a data processing engine configured to cleanse, correlate, link, etc., transactional and unstructured data, and a cognitive data layer (CDL) configured to process the transformed crawled data with various models and algorithmic libraries of metrics, trends, and metadata to identify a root cause of an issue and prescribe actions to mitigate or overcome risks related to the issue. A cognitive development kit is configured to build a specific skill application on top of the cognitive operating system, the specific skill application generating recommendations, actions, and predictions. A search processor and GUI are configured to perform a search request of the data in the CDL and display the results in the GUI.

BRIEF DESCRIPTION OF THE DRAWINGS

FIG. 3D is an example GUI depicting a functionality provided by a cognitive merchandise management skill.

FIG. 5A is an example search GUI, consistent with various embodiments.

FIG. 6A is a home screen GUI of the CAP, consistent with various embodiments.

FIG. 6B is a web GUI for displaying transaction-level detail, such as a report of various orders, of an enterprise, consistent with various embodiments.

FIG. 11B is a sample GUI that depicts a grid of skills tiles, consistent with various embodiments.

DETAILED DESCRIPTION

Figure 1:
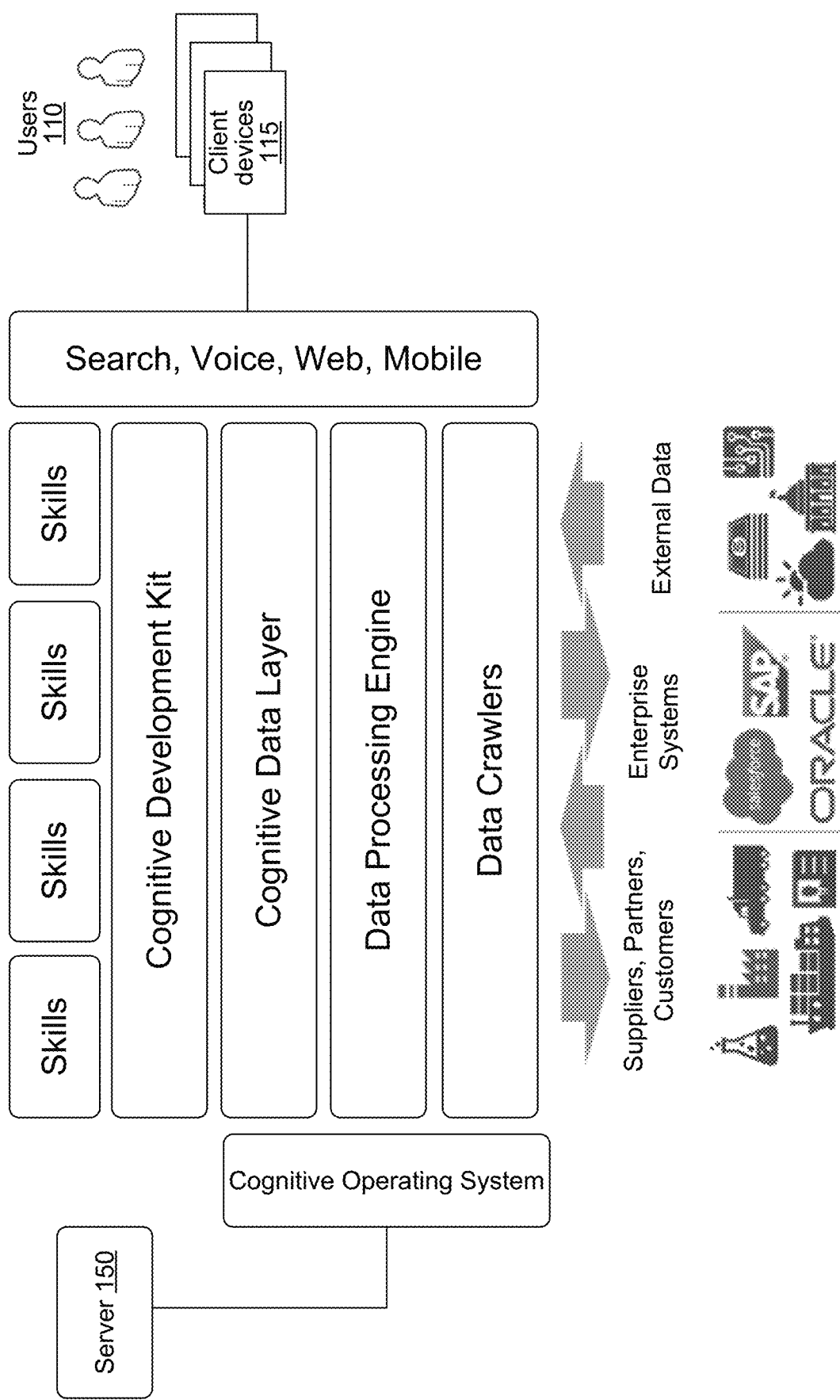
FIG. 1 is a block diagram of an environment 100 in which the cognitive automation platform (CAP) can be implemented.

The disclosure is related to a cognitive automation platform (CAP), which can be implemented for various application areas, such as running an enterprise, achieving improvements in sports (e.g., a baseball player's performance), generating efficient and accurate operations of a robot (e.g., robots landing on other planets), and health-related (e.g., determining the root cause of a patient's heart failure). It should be appreciated that while some specific examples herein pertain to the application area of running an enterprise, such application area is not meant to be limiting. Rather, describing examples in the application area of running an enterprise is for the purposes of understanding, not limitation.

Cognitive automation mimics human behavior, which is in many ways more complex than the actions and tasks mimicked by current automation technologies such as robotic process automation (RPA). While RPA relies on basic technologies, such as screen scraping, macro scripts and workflow automation, cognitive automation, on the other hand, uses more advanced technologies, such as natural language processing (NLP), text analytics, data mining, semantic technology, artificial intelligence (AI) and machine learning (ML), to make it easier to make informed decisions (e.g., for the human workforce to make informed business decisions). RPA is rules-based and works on the "if-then" principle. It is a process-oriented technology, which is often used to work on time-consuming tasks that were previously performed by offshore teams. Cognitive automation is a knowledge-based technology. Here, the machine goes through several human-like conversations and behaviors to understand how humans talk or behave and defines its own rules.

Cognitive automation can interpret unstructured data, unlike the RPA processes, to build relationships and find similarities between the items by learning from association. For example, if an organization has thousands of unstructured invoices and purchase orders sitting in a database, cognitive automation tools can build relationships between the entities by asking questions such as: "Have I seen this quality before?" "How was it used earlier?" "How is it connected to what was seen earlier?" and so on. By asking these questions, the cognitive automation platform can interpret and process data with minimal or no human supervision.

Embodiments of the cognitive automation platform (CAP) can be used to implement cognitive automation in various industrial applications such as banking, insurance, finance, healthcare, retail, manufacturing, and real estate. For example, doctors can leverage cognitive automation with AI techniques to analyze a patient's condition to determine a diagnosis. In another example, a large enterprise such as a pharma company can use the cognitive automation in the manufacturing and sales of their products. The CAP can help businesses in autonomously orchestrating operations, such as monitoring sales of their products, identifying any problems with the sales, identifying solutions to the problem, recommending solutions to a human operator, or autonomously acting on behalf the human operator, at least in part, to the solve the problem.

An embodiment of the CAP can deliver technology that autonomously orchestrates operations for an organization (e.g., an enterprise). The CAP leverages the best of AI, ML, NLP, data and enterprise domain expertise to deliver real-time cognitive automation at internet scale. The CAP can understand how a business works, make real-time recommendations, predict outcomes, and take actions autonomously. The CAP can continuously crawl systems (e.g., enterprise, health, or systems with a baseball player's statistics), refine, index, and augment the obtained data, and deliver end-to-end, real-time visibility into the operations. With regard to the application area of running an enterprise, an embodiment of the CAP dynamically uncovers opportunities to improve financial and operational performance of an enterprise using AI, ML and business domain expertise. The CAP can predict business risks and opportunities using real-time data and AI, and proactively engage with relevant users and drive the execution of their decisions. Similarly, an embodiment of the CAP can dynamically uncover opportunities to improve a patient's heart failure condition using AI, ML and cardiac domain expertise. The CAP can predict cardiac risks and opportunities using real-time data and AI, and proactively engage with relevant users (such as the patient, the patient's family, cardiologist experts, etc.) and drive the execution of their decisions.

In an embodiment, the CAP obtains data from within an organization and/or outside of the organization, e.g., cloud services, processes the various types of data so obtained to generate functional business models and algorithmic library of key metrics, trends, and metadata, not available in transactional systems (e.g., enterprise) or applications (e.g., business, health, sports-related, etc.). The CAP generates an audit trail of an occurrence of various conditions, e.g., problem conditions, and notifies a user of such conditions. The user can provide instructions to the CAP to take specific actions. The CAP can also have a working memory of past decisions and actions taken by users, departments and role-specific functions. The CAP can generate recommendations for solving a specified problem, which the user can accept, modify, or ignore to solve the problem. The recommendations can be generated based on the previous actions taken by the user for similar problems. In an embodiment, in generating a recommendation for a specified problem, the CAP can evaluate whether one or more previous recommendations for solving the specified problem was accepted by the user, a reason for rejection of the recommendation if it was not accepted, the parameters that were changed if the recommendation was modified etc. In some embodiments, if the recommendation was not accepted or modified, the CAP evaluates the outcome of the action taken by the user versus the outcome had the recommendation made by the CAP was accepted by the user, and presents the evaluation to the user. Further, based on the evaluation of the outcome, the CAP adapts the recommendation, e.g., improves the recommendation for the next time if the outcome of the CAP recommended plan is not better than the user action In some embodiments, if the outcome of the CAP recommended plan is better than the user action, the CAP can autonomously take the action on behalf of the user to solve the problem, and/or generate a notification indicating to the user that the outcome of the previous recommendation would have been better than that of the action taken by the user for solving a similar problem and recommend the user to accept the CAP generated recommendation. For example, CAP can identify by looking at the current sales trends and predict that the two SKUs will be oversold in a specific geography. At that time, CAP will run different scenarios to identify if inventory is available to cover the oversell demand. If not, then CAP will generate a recommendation for the user to increase the forecast. CAP will then store the user action (e.g., Accept, Reject, Modify, Ignore) along with the contextual point-in-time details related to the recommendation and details of the measures used for calculating that recommendation into permanent memory. CAP will then compare the stored data with the actual sales as and when it becomes available. By comparing the actual data against the projected data of the recommendation, which is stored in the permanent memory, and applying multiple CAP, CAP will assign the ranking value to the quality of recommendation. This ranking value, along with the stored contextual data for a recommendation will be used to train the CAP using techniques such as Reinforcement Learning/Deep Reinforcement Learning, Neural Networks, or other advanced machine learning algorithms. This way, the CAP can adapt itself or evolve over time, e.g., based on a history of actions taken by the user or the CAP, to solve various problems intelligently. Users interact with the CAP (consume and input data) through various means, e.g., natural language voice, search interfaces, and visual analytics (including dashboards and reports).

FIG. 1 is a block diagram of an environment 100 in which an embodiment of the CAP can be implemented. The CAP includes a cognitive operating system (COS) that helps to enable cognitive automation and one or more skills, which are applications configured to provide cognitive automation for a specified functionality of a specified industrial application, and are discussed in detail below. For example, a forecasting demand skill is an application that forecasts demand for a specified product or service of an enterprise. Other examples of skills can include optimizing manufacturing performance, predicting supplier performance, determining sales revenue, etc. The skills make use of the COS to provide cognitive automation in the corresponding functionality.

In an embodiment, the CAP includes a data crawler, a data processing engine and a cognitive data layer (CDL). The CAP can be implemented on a server computing device ("server") 150. The CAP can be implemented on a single server or multiple servers, or can be distributed across servers. The CAP is an internet-scale, AI-enabled OS that delivers a self-driving organization or enterprise. It uses AI and ML to analyze proprietary (e.g., enterprise-wide) data and external data continuously and makes optimal decisions autonomously for the enterprise or organization, e.g., about capital and resources. The CAP can act autonomously, providing a closed-loop system for performance improvement based on continuous learning.

The data crawler can be programmed to automatically discover, and extract data stored in enterprise or organizational systems, whether on-premise or external systems, for real-time analytics. The data crawlers can integrate with on-premise and cloud applications and rapidly extract source data, without requiring a VPN tunnel or changes to network firewalls. The data crawlers are optimized to extract information (e.g., business-critical) from transactional systems on an ongoing basis, with minimal impact to their performance. The data crawlers leverage a proprietary rule set to gather transactional data from multiple systems, including enterprise resource planning (ERP), planning, customer relationship management (CRM), financial systems, IoT data from machines and devices, point of sales data, external data such as weather, economic indicators, transportation and logistics data, commodity pricing, trade promotions, social media feeds, online product reviews, visual data using images or video feeds such as selves status, customer traffic, parking lot feed, satellite imaginary (multiple parameters), and geo-spatial data. The data crawlers can be programmed to extract data from any data source and/or recognize new data sources and fields in any of the enterprise or organization systems. An example of such data crawler can be found with reference to U.S. Pat. No. 8,504,609, which is incorporated herein in its entirety. Data sources or types of data crawled can span multiple areas such as but not limited to sales, procurement, quality, manufacturing, inventory, finance and material movements. It should be appreciated that crawling is a process, as mentioned earlier, to process data from the source and convert it into CDL. The innovative platform provides a tool for users to configure and extend crawlers.

The data crawlers are highly scalable, e.g., can be run with multiple connectors in a cluster to crawl and index billions of records daily. An example of such data crawler and connectors can be found with reference to U.S. Pat. No. 8,504,609, which is incorporated herein in its entirety. The execution of data crawlers has minimal transactional impact. For example, crawlers can be optimized to run on specified enterprise systems, e.g., mission critical system, to extract changed data at the optimal time. The data crawlers can be compressed using one of many compression technologies to significantly reduce the size (e.g., over 90%) of data transfers, which enables rapid movement of data to the cloud and minimizes impact on the network, e.g., consumes less network bandwidth. The data handled by the data crawlers, whether at rest or in transit is secure as the data is encrypted, e.g., using industry standard secure socket layer (SSL) technology such as AES 128. In some embodiments, the aspects of integrations including data transfers are logged and auditable including each step in the process (start, transfer, processing, completed, etc.)

In an embodiment, the data processing engine transforms (cleansing, de-duping, correlating, linking and harmonizing) the transactional and unstructured data crawled from internal and external sources into a cognitive data layer. In some embodiments, for large organizations with complex information technology (IT) landscapes, the data processing engine can integrate multiple systems (e.g., ERP, CRM and planning systems) across geographies, using fuzzy logic and built-in algorithms. Customers' enterprise data can also be augmented with external data such as weather, Google Trends, regulatory data, commodity prices, and more, depending on their unique requirements.

The data processing engine can use one or more technologies such as Spark, Hadoop, Redis, and Nginx to manage enterprise data. The data processing engine processes the data without any data loss. The data is fully traceable—from aggregated data views to transactional data points. In an embodiment, such data process pipelines are orchestrated using the unique Execution Plan (EP) logic, which allows CAP users to group multiple crawlers and process steps into a single EP and any combination of sequential or parallel execution of the crawlers and data processing. EP generates an ordered plan for each pipeline which is then executed by the data processing engine at runtime to crawl, process, and store data into the CDL from the source systems. This level of data processing based on EP is unique and very flexible. The CAP users can model any level of complexity into a plan and combine the power of the platform's unique integration, such as disclosed in U.S. Pat. No. 8,271,541, which is incorporated herein in its entirety. In an embodiment, the software logic uses nodes, such as disclosed hi U.S. Pat. No. 7,530,050, which is incorporated herein in its entirety. This level of data processing flexibility is unique to the innovative CAP.

Leveraging data crawlers and the data processing engine, the CAP generates a CDL that represents the real-time state of an enterprise or organization. The CDL includes the crawled data enriched with functional business models and an algorithmic library of key metrics, trends, and metadata, not available in enterprise transactional systems or business applications. Examples of such metrics, trends, and metadata in the algorithmic library include but are not limited to On-Time Performance, Inventory Aging, Forecast Prediction, Projected Safety Stock Level, BOM Errors, Off Contract Purchasing, Raw Material Forecast, Projected Oversell/ Undersell, and Prediction of any time-series data using machine learning, historical trends, and snapshots. Additionally, the CDL can include snapshots of this data set, enabling time series analysis of performance and a working memory of past decisions and actions taken by users, departments and role-specific functions. For example, Global Inventory Snapshots stores point-in-time inventory data for every SKU. This snapshot data can be accessed as any other CAP data by just using the snapshot date filter. This snapshot data is stored into the same CDL, so access to this data is simple as any other data in CDL.

The CDL can have built-in domain expertise for example for critical business areas including supply chain, operations and manufacturing, with many business metrics, and dozens business data models. CAP allows users to create and configure new subject areas in CAP. A subject area is a group of dimensions and measure combinations and assigns any business name to this subject area such as Sales, Inventory, etc. CAP users can group multiple subject areas and create a domain or industry-specific group such as Supply Chain, Finance, Pharma, CPE, etc. The CDL can create time series information and track changes in the organization or business. The data in the CDL is indexed and searchable, e.g., using a natural language voice interface or text search. The CDL can also be enriched with external data such as weather, regulatory information, Google Trends, etc. The CAP includes application programing interfaces (APIs), which enables the CDL to be integrated into enterprise application landscape, e.g., with industry standard representational state transfer (REST)-compliant web services. CAP users can generate a view of CDL in the platform and then make that specific view available as a REST API. For example, a user can create a North America Sales View using multiple columns such as Customer Name, City, SKU, Date, etc. Once the view is created, it is available as REST API for any other application to execute and read data into other applications. CAP users can also create a process in the platform using a process builder such as the patented process builder disclosed in U.S. Pat. No. 7,530,050, which is incorporated herein in its entirety, to receive data using REST API.

Figure 2:
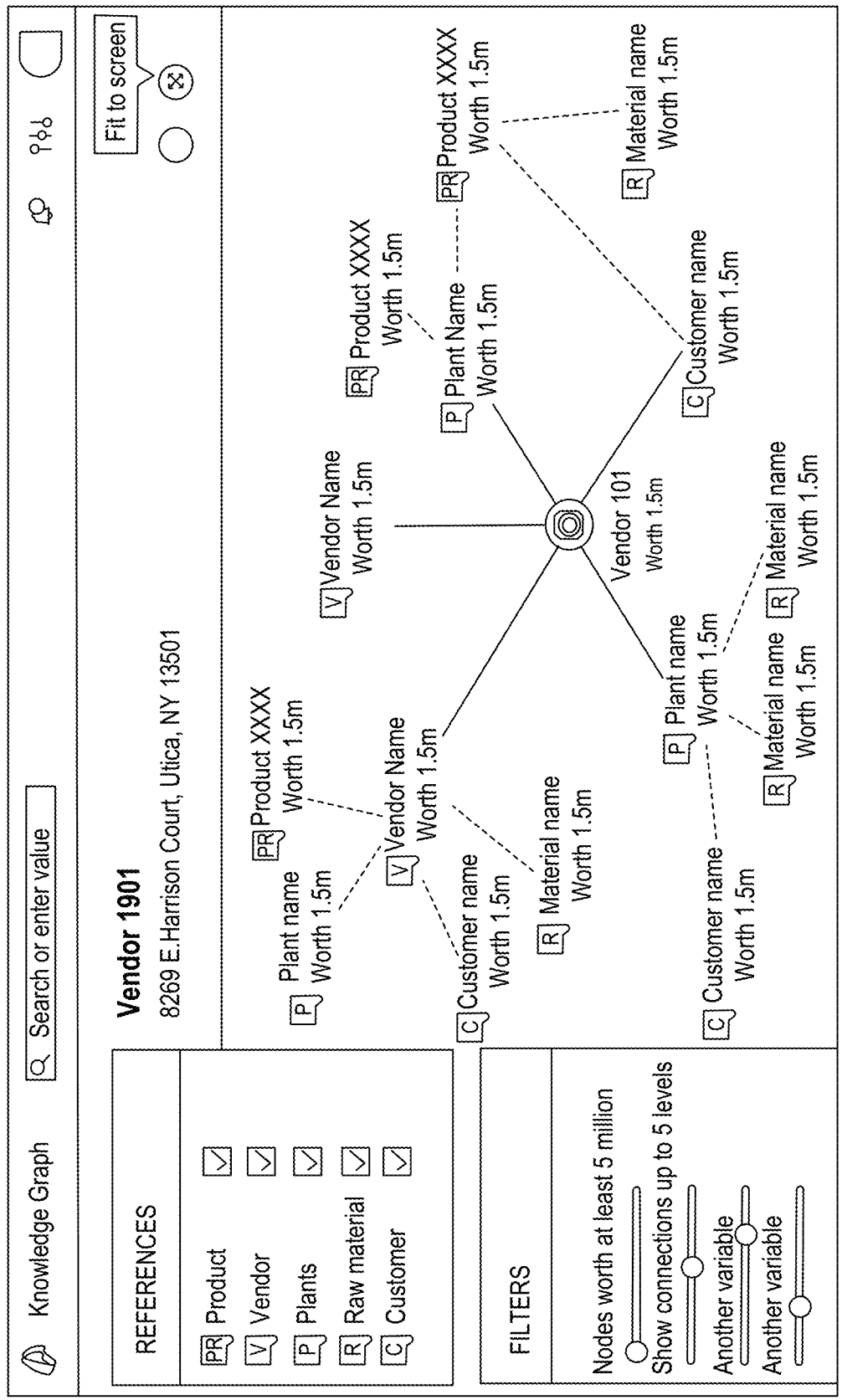
FIG. 2 is an example of a knowledge graph representing relationships between various entities, consistent with various embodiments.

The CDL enables generation of knowledge graphs (e.g., enterprise or organizational), which can reveal implicit and explicit relationships within various entities of a business or organization. For example, this includes relationships and dependencies between vendors, products and customers. CAP allows users to create new objects in CDL such as Entity and Relationship. Users can define attributes for each Entity and Relationship. This enables CAP to capture both data and its relationships and build the knowledge graph using the interconnected Entities and Relationships objects defined in the CDL. Once these relationships are defined, the CAP engine generates a knowledge graph representation of this data that can be accessed on the fly and keeps it updated using the same crawler and EP-based integration disclosed above. FIG. 2 is an example of a knowledge graph representing relationships between vendors, manufacturing plants, customers, materials, and products. By combining the enterprise knowledge graphs with predictive algorithms, the CAP can identify and assess the impact of risks and opportunities across the business or organization. Knowledge graphs enable CAP to generate a new automated predictive model using advanced graph techniques such as GraphAL, Feedforward Neural Network, Convolutional Neural Network, Graph Neural Network or other algorisms which benefits by the entity relation model. Examples of such impact of risks and opportunities can include understanding what impact a supplier failure will have on an organization's customers, or identifying a hidden opportunity to capture more sales by shipping excess inventory. The knowledge graphs can also be used to enhance natural language search results. Searching for a specific customer, for example, will also display suppliers, products and locations that could be of interest based on the customer's purchase history.

Figure 3A:
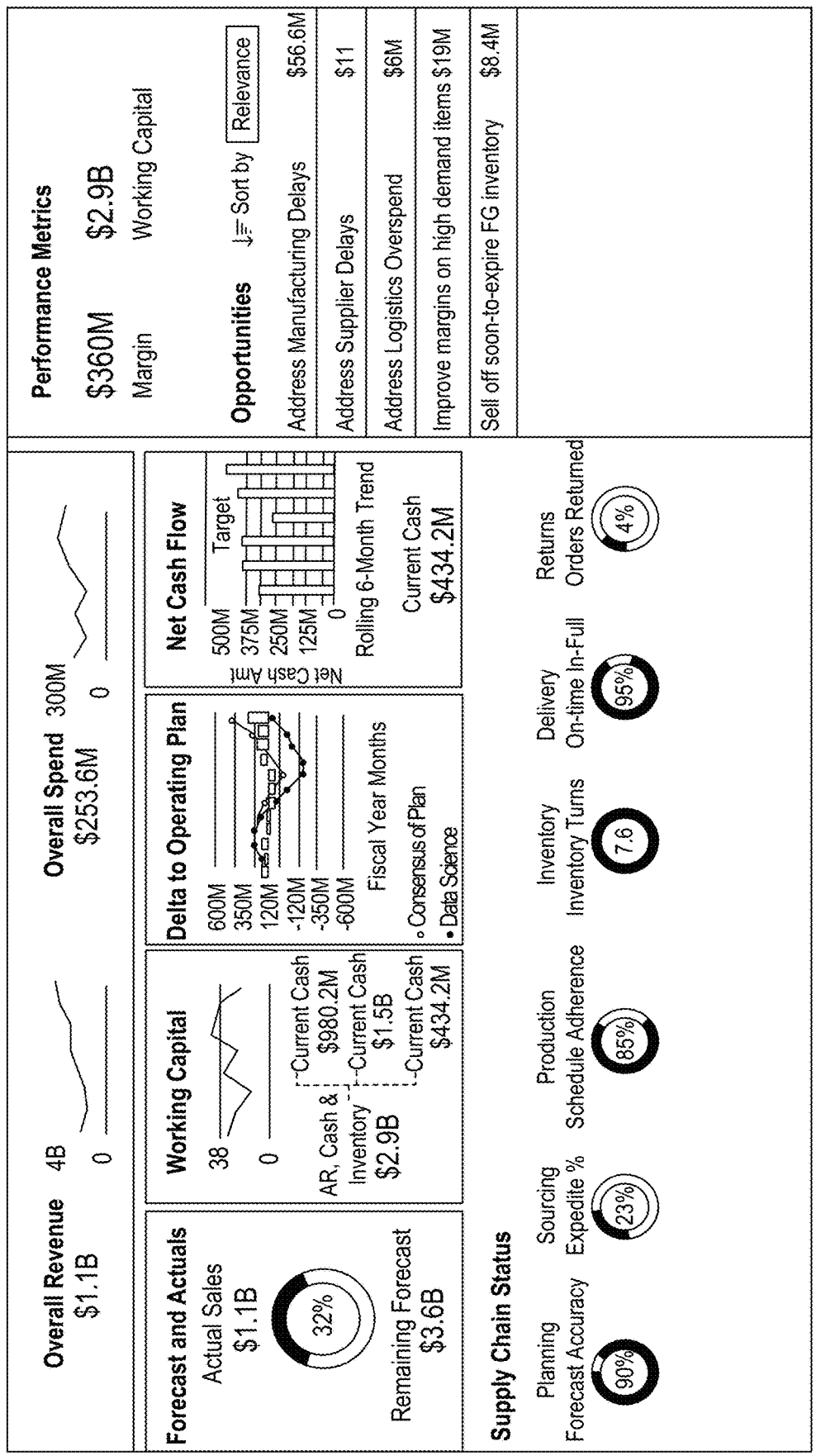
FIG. 3A is an example graphical user interface (GUI) depicting a functionality provided by a supply chain management skill, consistent with various embodiments.
Figure 3B:
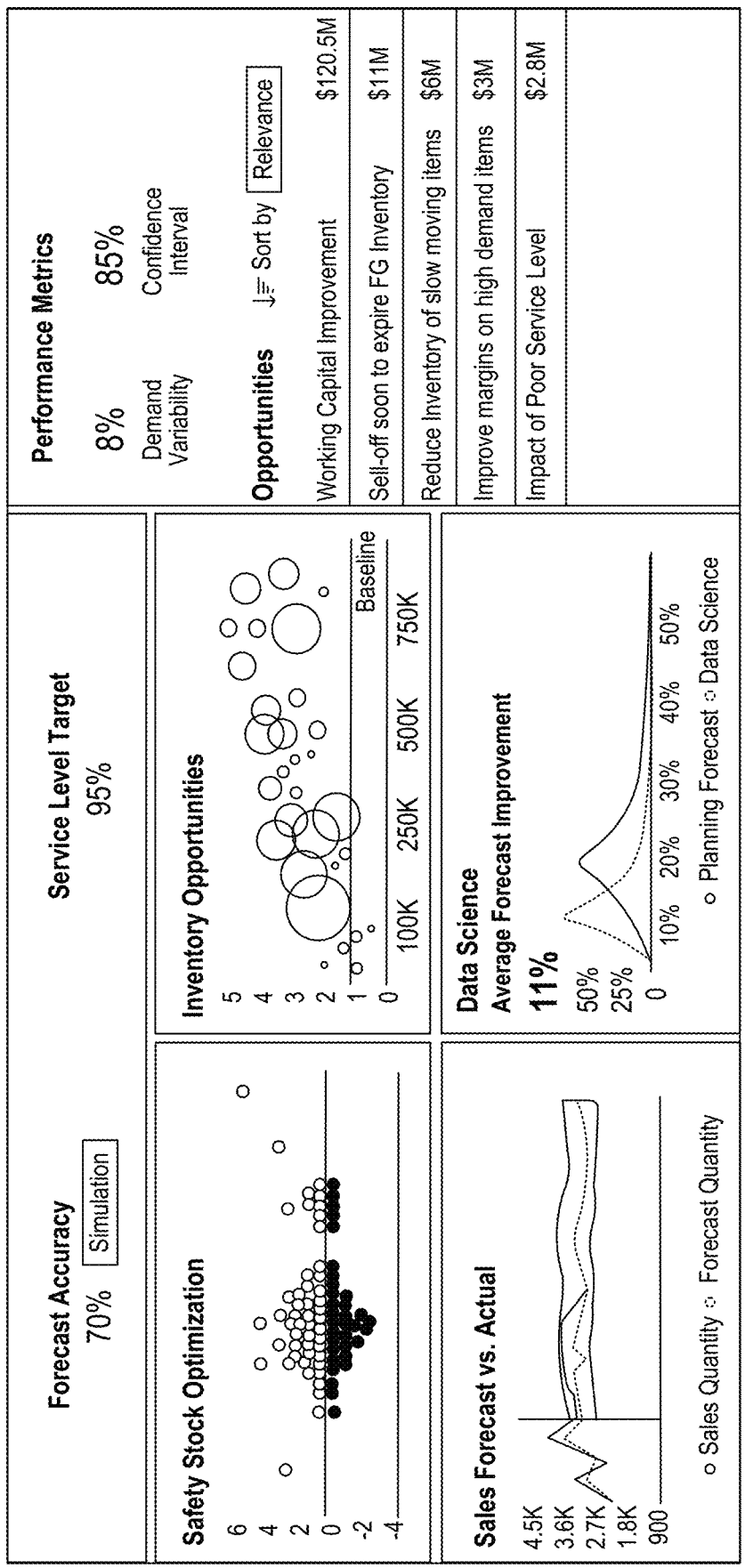
FIG. 3B is an example GUI depicting a functionality provided by a cognitive demand management skill, consistent with various embodiments.
Figure 3C:
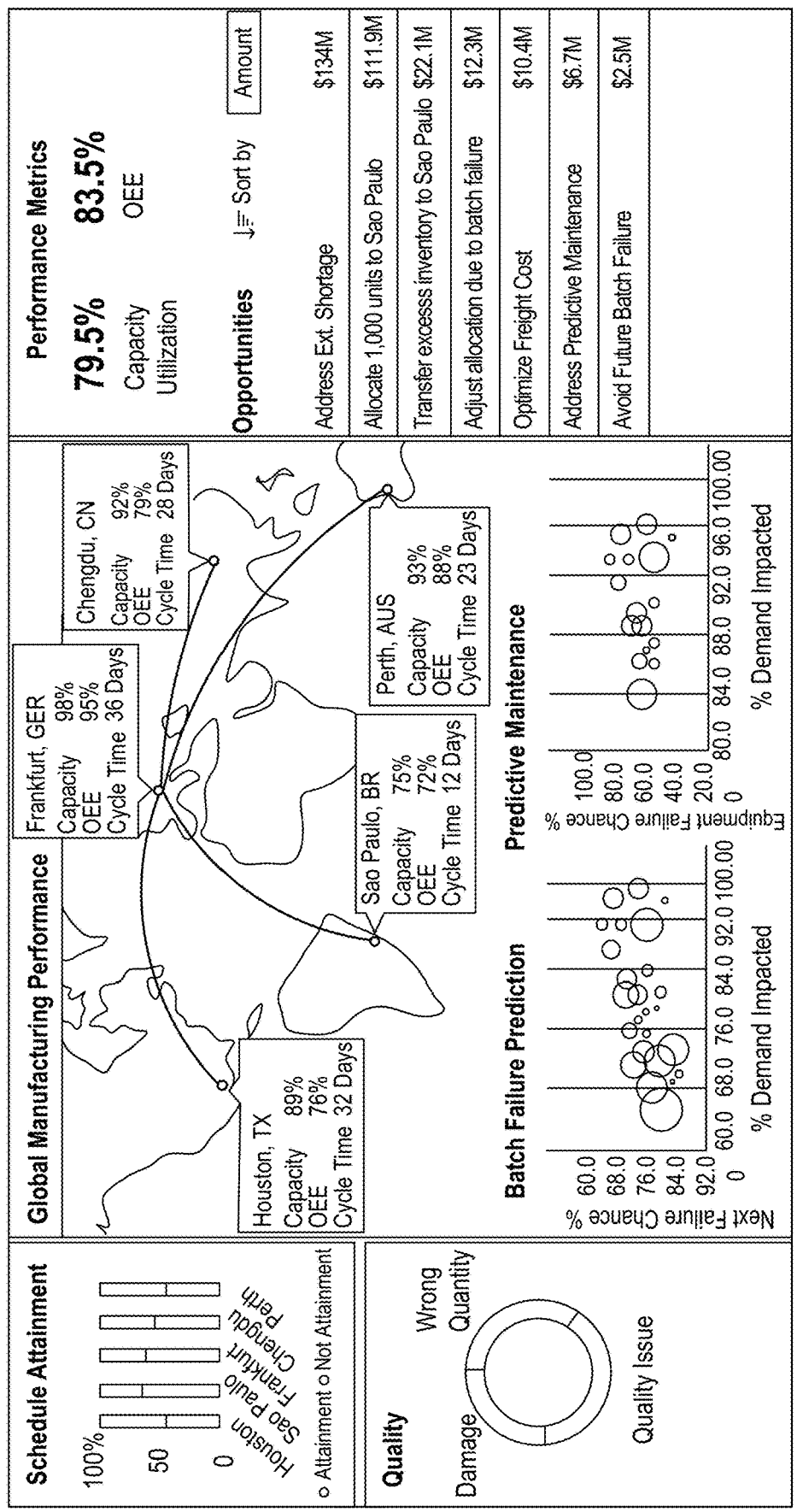
FIG. 3C is an example GUI depicting a functionality provided by a cognitive manufacturing performance skill.
Figure 3D:
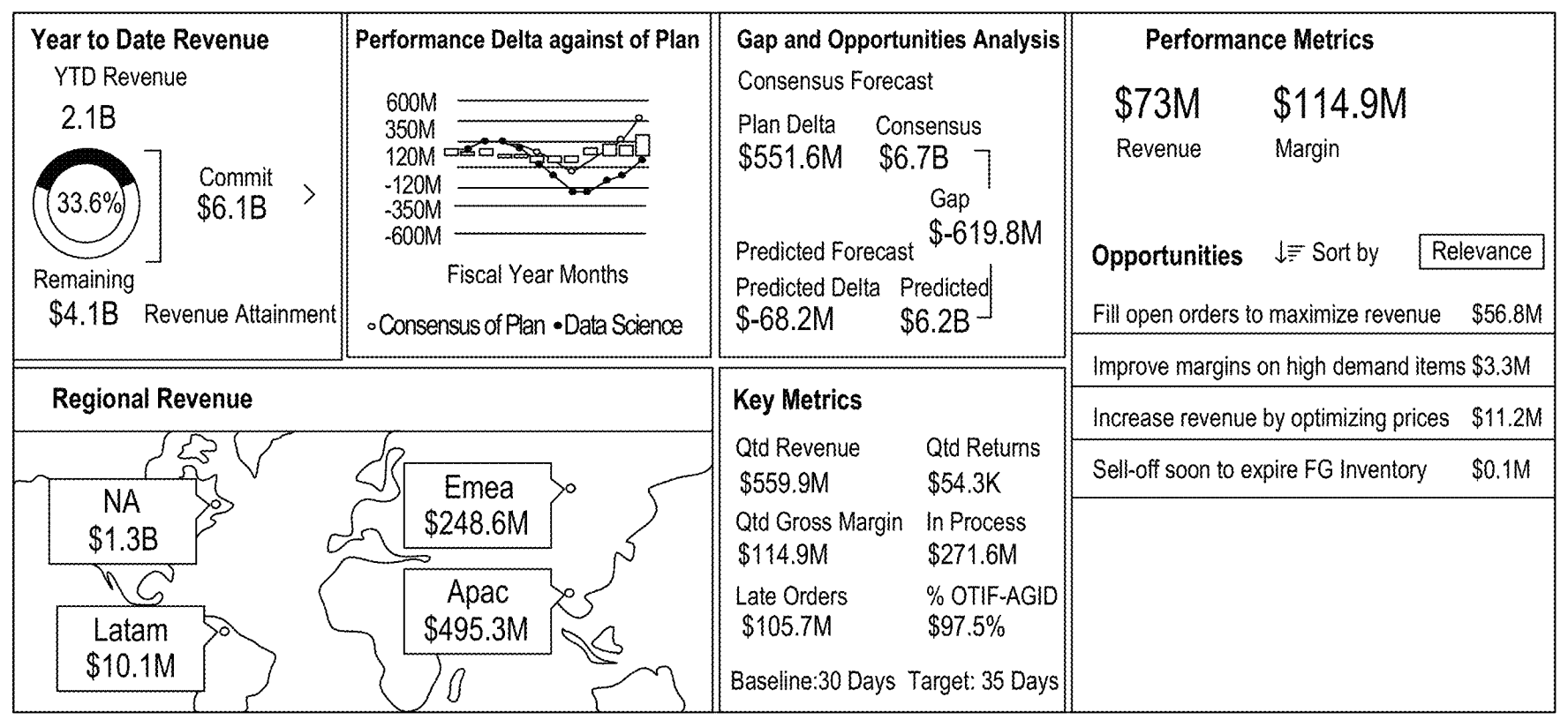

Skills are applications that provide a specific functionality for a business. For example, a forecasting demand skill is an application that forecasts demand for a specified product or a service of an enterprise. Other examples of skills can include skills for optimizing manufacturing performance, predicting supplier performance, determining sales revenue, etc. CAP provides Skill development tools where technical users of CAP can combine CDL elements, process logic, UI screens, prediction models into a single package as a Skill. There is no input needed specific to Skill as long as the CDL elements are defined for the skill. Skills are self-contained applications. FIGS. 3A-3D are graphical representations of functionalities provided by various skills. FIG. 3A is an example graphical user interface (GUI) depicting a functionality provided by a supply chain management skill. FIG. 3B is an example GUI depicting a functionality provided by a cognitive demand management skill. FIG. 3C is an example GUI depicting a functionality provided by a cognitive manufacturing performance skill. FIG. 3D is an example GUI depicting a functionality provided by a cognitive merchandise management skill.

In an embodiment, the CAP provides a CAP Developer (also referred to cognitive development kit (CDK), which is a software development kit (SDK) that can be used for building skills. As part of CAP Developer, CAP provides a Developer Interface with the visual tools needed to build a new skill or modify an existing skill. CAP developer comprises multiple workbenches to cover different stages of skill development such as data crawlers, EP creation, Process building, Prediction model creation, UI building, etc. Using these workbenches, CAP users can build any skill. Skills provide real-time insight, recommendations and predictions, allowing users to ask the right questions to take the right actions and deliver the right results. Skills identify business risks and financial opportunities and communicate with users and enterprise systems to automatically execute decisions by writing instructions back into source systems. Skills combine the data in the CAP with embedded AI to deliver cognitive automation at scale For example, Touchless Forecasting is a skill where aspects of forecasting are automated, such as getting data using crawlers, applying prediction algorithms on the extracted data in CDL, automated forecasting algorithm ranking based on the accuracy metrics, selecting the best forecast for each SKU, storing the newly generated forecasting to CDL, automatic uploading the newly created forecast into customer planning systems based on process logic defined using the unique process builder, such as disclosed in U.S. Pat. No. 7,530,050, which is incorporated herein in its entirety. The entire skill process is automated without any human intervention.

A skill can have real-time visibility into company's or organization's operations using the internal and external data obtained by the data crawlers. A skill can make recommendations to the users, e.g., to take advantage of future opportunities or mitigate risk. A skill can predict and enhance company's or organization's performance using embedded AI and ML. A skill can orchestrate actions autonomously to improve profitability and efficiency.

In an embodiment, the CAP can provide predefined skills (e.g., forecast, promotions, order, inventory, procurement, digital control tower, logistics) to an enterprise or organization or enable the users of the enterprise or organization to modify and/or create new skills using the CAP Developer. The CAP Developer allows developers to create and deploy skills, e.g., visually, with minimal coding, as disclosed above.

Figure 4:
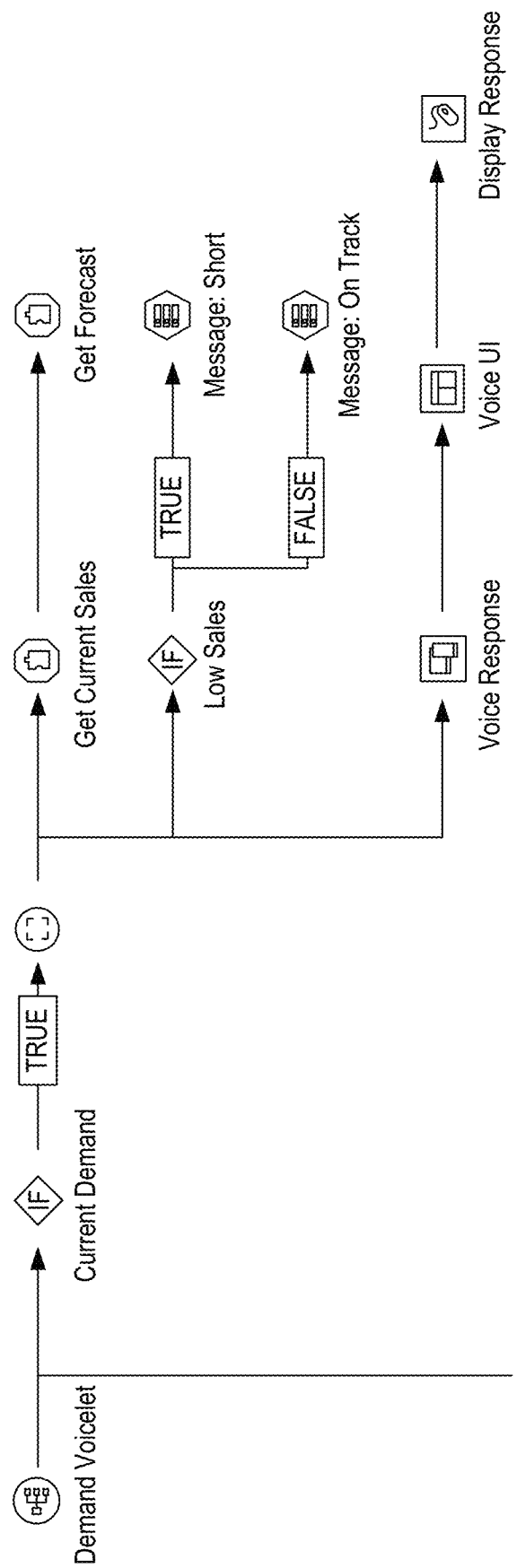
FIG. 4 is a block diagram of a visual development environment for building a skill using the cognitive automation platform developer, consistent with various embodiments.

FIG. 4 is a block diagram of a visual development environment for building a skill using the CAP Developer. The CAP Developer enables users to build the skills having sophisticated business logic with a simple set of visual constructs. In some embodiments, this approach is called depth-first processing where processes are represented in a tree-like interface, where each node in the tree executes first along a horizontal path (depth), before executing vertically as the decision tree expands. Each node is configurable, and a group of nodes are reusable for other processes. This technology allows users to quickly build complex skills with embedded AI in a highly modular fashion using drag and drop functionality. This also makes it easy to adapt and modify skills depending on evolving business needs. In some embodiments, depth-first processing is best suited to visually codify complex orchestration of processes that involve human intelligence and deeply nested decisions. In an embodiment, this unique execution logic is disclosed in U.S. Pat. No. 7,530,050, which is incorporated herein in its entirety.

In an embodiment, the CAP provides the infrastructure, security, services, and specialized development tools so that enterprises or organizations can build new cognitive skills on the CAP, sharing its core services. With the CAP Developer, an enterprise or organization can integrate their IT landscape with the CAP. The CAP Developer enables the enterprise or organization to leverage programmable crawlers to ingest new data sources and blend and enrich the CAP. The enterprise or organization can add visualizations, logic (e.g., business), and actions, and leverage built-in ML microservices using the CAP Developer. The CAP Developer enables the enterprises or organizations to create packages and deploy them to scale on the CAP and securely provision to end users of the business or organization. As mentioned above, CAP users create skills that are deployable in any other CAP environment. For example, CAP user can build an Inventory Skill in a development environment and then deploy this skill to a Production environment using built-in deployment CAP deployment tools. In accordance with embodiments herein, the processing capabilities are packaged as a Skill.

The CAP Developer leverages the CDL to work with real-time data. This means developers can build skills without dealing with the pain of data integration, cleansing, normalization, and validation that they would with other applications or SDK's. The CAP Developer provides a drag and drop interface that can make it easy to build skills using a library of pre-defined visual constructs. Process Builder is our tool for drag/drop interface where users can define the logic using nodes. Once the CDL is ready, users will use the process budder to define the skill logic, including inserting custom software program code. Logic can be defined for processing data, UI (e.g., for web, mobile, voice), AL, and writebacks into multiple backend systems—using nodes available in the process budder.

The users 110 can access the skills from their client devices 115 via multiple means, e.g., web interface, search interface, visual analysis means such as dashboards and reports, and/or natural language voice interface. The client devices 115 can include one or more of a desktop, laptop, a tablet PC, a smartphone, a wearable device or any other computing device that can connect to a computer network.

FIG. 5A is an example search GUI, consistent with various embodiments. The search GUI displays a result of a search performed for a specified customer. In some embodiments, the search GUI organizes the results into contextualized widgets with summaries, trend, and key metrics, and the results are integrated with knowledge graphs that suggests important related information that users may need to know. In some embodiments, the search GUI can display three components, such as a dashboard, a knowledge graph, and recommendations.

The dashboards can be pre-mapped to indexed entities, enabling the most relevant insights to be fetched and displayed automatically at the time of search. For example, in a search for a company name such as "Supermart," the CAP can determine that "Supermart" is a customer entity and uses this information to display a customer dashboard with customer information and other related information, e.g., various metrics associated with the customer, such as invoice amount, late payment amount, net amount, materials ordered by the customer, and plant names etc. In some embodiments, in a search for a vendor of the enterprise such as "Taples," the CAP would identify the entity as a vendor and display a different set of relevant, contextualized data.

The knowledge graph is configured to provide further context to the search by displaying a visual map of the relationships and dependencies between the search term and related entities, e.g., in the supply chain. Suppliers, customers, raw materials, and locations are linked together based on the CAP's analysis of the underlying transactional data. For example, customers are linked to suppliers based on the raw materials that go into the products that they buy. Locations that ship those products are ranked and displayed based on the volume of shipments, etc. To achieve this, the CAP uses sophisticated data science algorithms on top of enterprise transaction data obtained from the crawlers, such as for example those discussed above.

The CAP can use data science against the transactional data stored in the CDL to identify and recommend entities that are statistically similar to the search term. The generated recommendations can include similar customers based on purchase behavior, relevant suppliers based on materials supplied, and delivery locations relevant to customers or products.

Further, the search GUI may also be personalized, e.g., results may be presented based on user role, usage history and other factors. Search results provide automated insights, without the complexity of manual data analysis. Additionally, data science is embedded into every search to provide relevant recommendations and suggestions for similar search terms. For example, analyzing the user usage history such as measure list, dimensions, filters, role, reports, dashboards, or similar data points, the platform's algorithms generate a list of most probable views to display as search results based on the user's search terms and historical data. The search GUI also displays names of customers similar to the searched customer.

In some embodiments, the CAP continuously collects, parses, and stores key data from the CDL into an index to facilitate fast and accurate information retrieval through search. This provides users a single, real-time way to search with typeahead capability across customers, products, suppliers, and other entities, even if that data is captured and stored in multiple transactional systems (e.g., enterprise transactional systems). Some example data items that are indexed include customers, parts, plants, products, suppliers, reports, and dashboards. In some embodiments, the CAP indexes data using Elasticsearch and leverages a sophisticated architecture that ties together the CDL with an efficient stream-processing engine powered by Apache Kafka. This architecture enables the CAP to index and organize real-time data in parallel and with great efficiency. The scope of indexed entities can be quickly expanded based on the unique needs of each customer. As descripted earlier, the aspects of CAP can be configured or extended using the CAP Developer Interface. In indexing the data, the data automatically enters a queue after each refresh of the CDL CDL is refreshed based on the user-defined scheduled available in CAP Developer Interface. Users can define the fine-grained refreshed frequency for each object in CDL and a specialized stream-processing technology pulls the data from the queue to populate the index. In an embodiment, the process on data indexing is based on standard technology. During a search, the index is accessed in real-time to provide the typeahead in the search GUI.

Figure 5B:
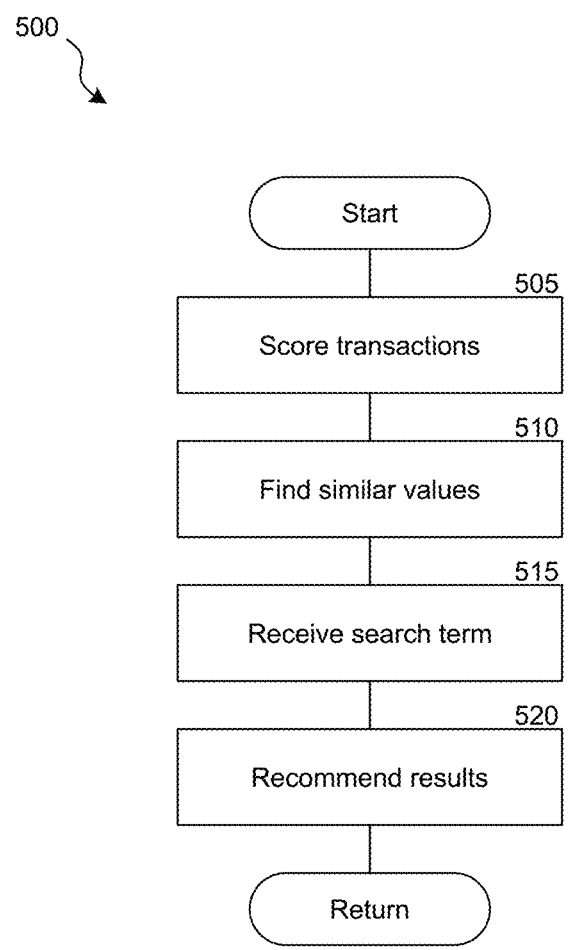
FIG. 5B is a flow diagram of a process for performing a search in the cognitive automation platform (CAP), consistent with various embodiments.

FIG. 5B is a flow diagram of a process for performing a search in the CAP, consistent with various embodiments. The process 500 may be implemented in the environment 100 of FIG. 1. Data science is deeply embedded into every search to provide recommendations and reveal connections in the dataset through the visual knowledge graph. To accomplish this, the CAP can leverage any of known data science techniques, e.g., collaborative filtering used to recommend products based on user behavior. The CAP can use such a technique to data (e.g., enterprise), continuously analyzing the large volume of transactions stored in the CDL to determine the similarity between entities, such as vendors, plans, customers, parts, materials, and products. During a search, the CAP compares the search term with a similarity score to make recommendations.

At block 505, the CAP scores the transactions. The CAP analyzes the historical transactions of indexed entities to determine their association with one another. In some embodiments, special weightage is given to more recent transactions. The CAP then normalizes the data and aggregates into a score. For example, a user searches for the text 5112345. CAP will first search all the transactions matching the search term and identifies that the exact term matches 1:1 with a sales order number. If the same term matches more than one entity, the user is provided with a list of entries to select. Once the unique entity is identified, CAP takes the dimension ID from the search result and queries the CDL for the specific sales order. Based on the data associated with the specific sales order such as customer name, location, and date range, the search results and views are dynamically generated and presented to the users.

At block 510, the CAP finds similar values by computing 'like' results by comparing the assigned scores and stores the result in a table in the CDL.

At block 515, the CAP receives a search command along with a search term.

At block 520, the CAP executes the search to recommend or generate search results. When the search command is received, the input search term is compared with the like results table in real-time and the most relevant results are displayed (based on the score).

Figure 5C:
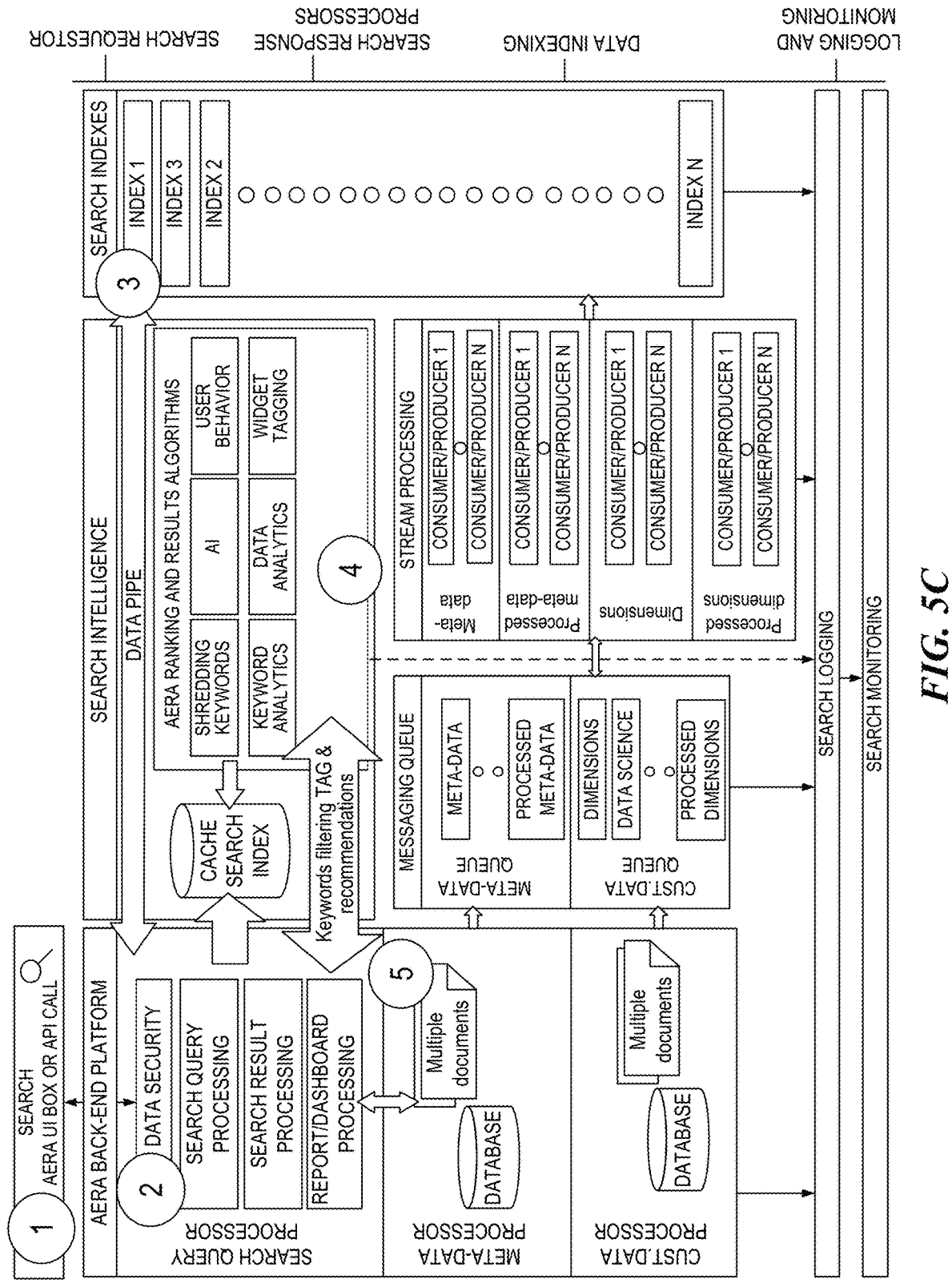
FIG. 5C is a block diagram of a search architecture for performing a search in the CAP, consistent with various embodiments.

FIG. 5C is a block diagram of a search architecture for performing a search in the CAP, consistent with various embodiments. The search architecture can be implemented in the environment 100 of FIG. 1. In step 1, a user types in a search query. In step 2, data security layer analyzes the search query to ensure the user has sufficient privileges to access the dashboard, report, or dimension that he or she is searching for. If the user has data access constraints in the system, such as plant number or company code, those filters will get passed along with the search query, further filtering the scope of allowed searches. This ensures that data elements excluded from the customer's access privileges will not show up in the search results page.

In step 3, after the search query passes through the security layer, the CAP accesses the search indexes and displays the typeahead to the user in the search GUI. The typeahead dynamically predicts the user's search intent, showing a leading list of terms as the user types.

In steps 4 and 5, once the user selects a particular search value from the typeahead, the search result processing begins. The CAP will match the search term to a suitable visualization, populate the knowledge graph, and identify suggestions for related searches and similar results using built-in data science, as described above.

Figure 6A:
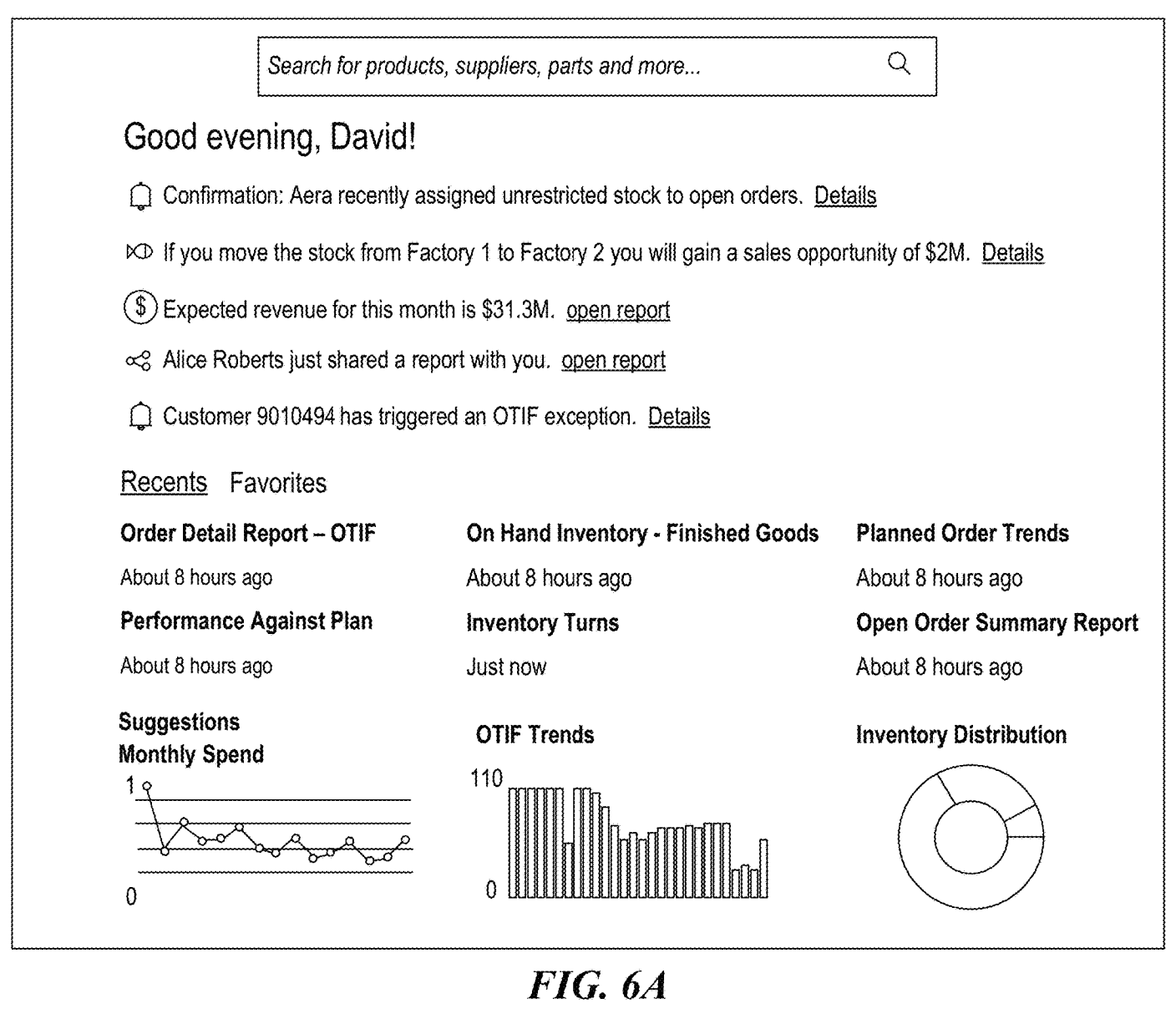

FIGS. 6A and 6B are web-based GUIs for accessing the various functionalities of the CAP. FIG. 6A is a home screen GUI of the CAP, consistent with various embodiments. FIG. 6B is a web GUI for displaying transaction-level detail, such as a report of various orders, of an enterprise, consistent with various embodiments. The users 110 can access one or more skills using the web GUI. The users 110 can create infographic dashboards that align to exact processes (e.g., business), set alerts based on pre-defined thresholds and metrics (e.g., business), add root cause decision-trees, and drill down to transaction-level detail in the web GUI.

Figure 7A:
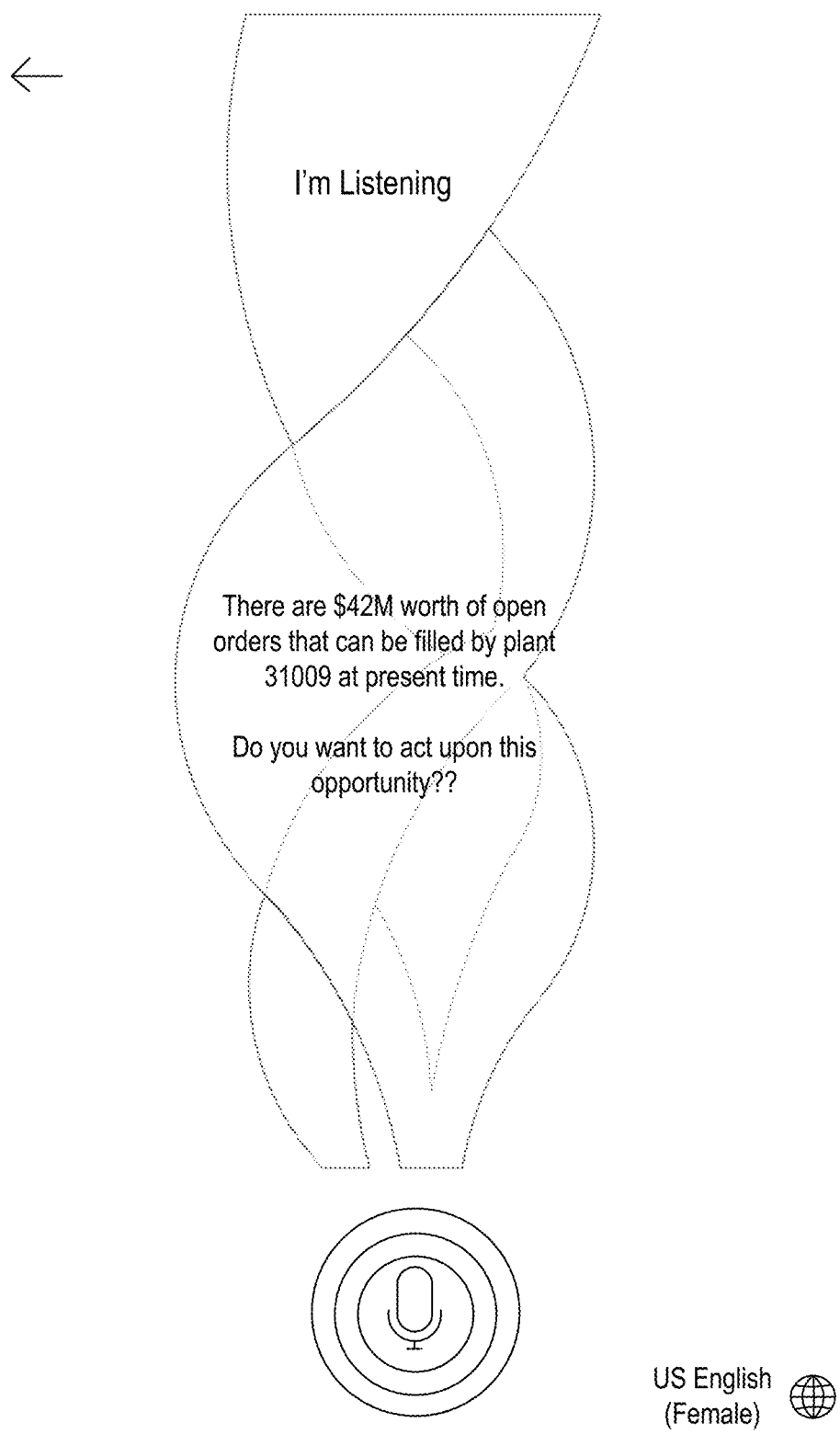
FIG. 7A is a mobile-based home screen GUI of the CAP, consistent with various embodiments.
Figure 7B:
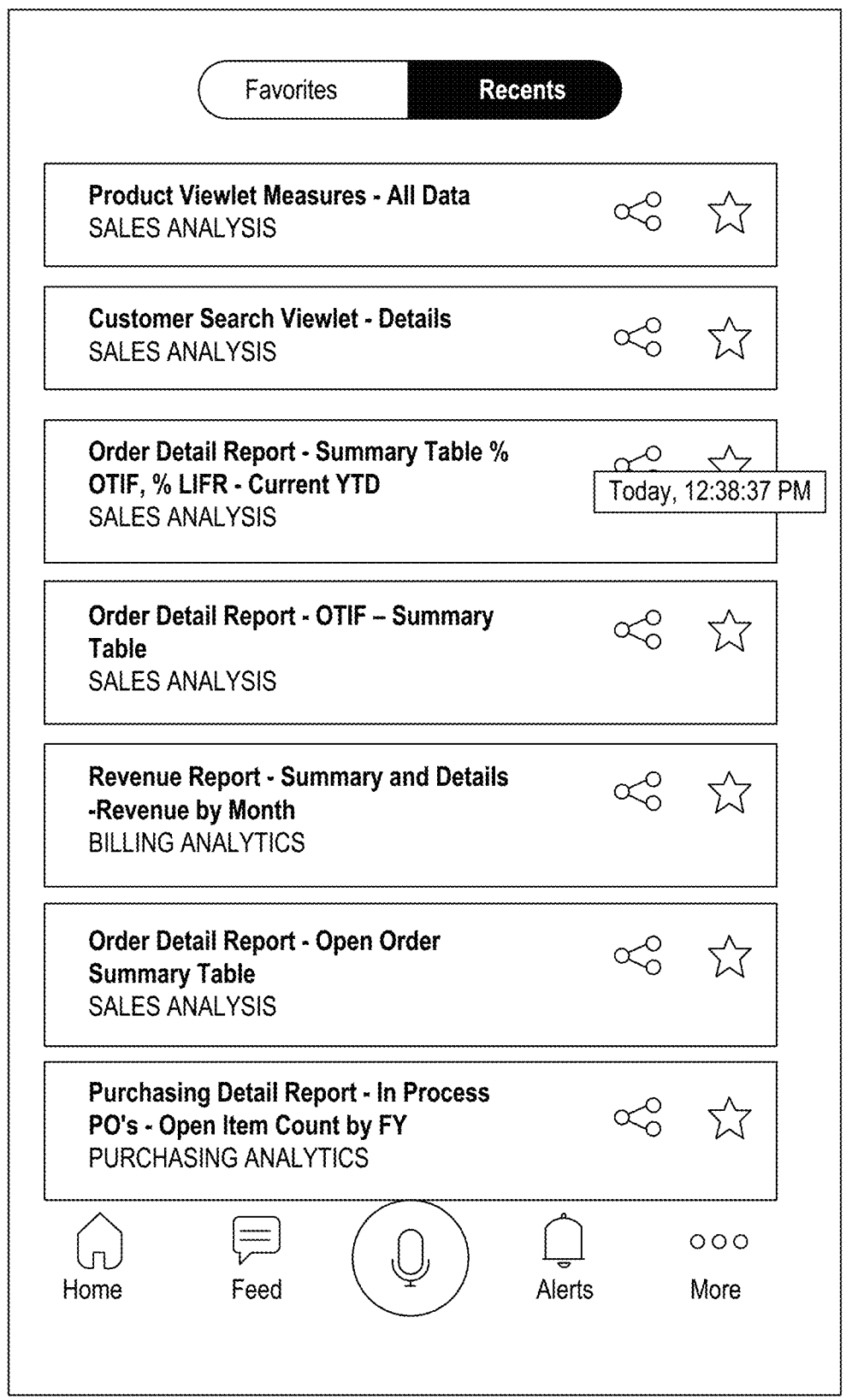
FIG. 7B is a mobile-based GUI displaying various skills, metrics, reports, or dashboards available in the CAP, consistent with various embodiments.

FIGS. 7A and 7B are mobile-based interfaces for accessing the CAP, consistent with various embodiments. The mobile based GUIs can be accessed on mobile devices such as smartphone or tablet PCs. FIG. 7A is a mobile-based home screen GUI of the CAP, consistent with various embodiments. The mobile-based home screen can feature natural language interface, that is, the user can provide commands to the CAP via voice. The mobile-based home screen GUI can also display AI-powered suggestions, such as enquiring the user if the user is interested in acting upon an opportunity, such as for example for filling open orders from a specified manufacturing plant. The user can respond either by providing a gesture-based command, e.g., tapping a button on the home screen, and/or a voice-based command, e.g., speaking into the mobile device. The mobile-based interfaces can also identify risks associated with an enterprise or organization.

FIG. 7B is a mobile-based GUI displaying various skills, metrics, reports, or dashboards available in the CAP, consistent with various embodiments. Examples of reports include but are not limited to sales analysis, purchase analytics, and billing analytics. The natural language interface enables users to ask questions and get answers with voice commands. The mobile-based GUI can also provide personalized, real-time suggestions. In an embodiment, the Mobile mode does not provide new recommendations but an interface to access the existing recommendations for the user. The voice interface is available in Mobile mode to query the open recommendations. In an embodiment, such voice interface is added to voice mode. The recommendations shown can depend on the role of the user, e.g., CEO of the company, VP of a specified business unit, a head of a specified department in the business unit or a hospital unit. Some opportunity-based recommendations can include improve revenue, working capital, cash flow, etc. It should be appreciated that recommendations can be for any business process and not limited to only what is provided out of the box. As mentioned above, users can create new skills for any business function, including but not limited to any logic generating skill-specific recommendations using the data available in the CDL for that specific skill. The mobile-based interface also allows the users 110 to initiate actions and workflows with voice commands, such as "rebalance inventory," "ship orders," and "run production." The mobile-based interface can also display key metrics, relevant dashboards and reports. In some embodiments, the mobile-based interfaces are implemented as part of a mobile "app" that can be downloaded to and installed on a mobile device.

The CAP includes a cognitive workbench (CWB) tool, which offers a whole new way to make decisions with data, providing personalized, time-sensitive, contextual recommendations to drive capital efficiency, revenue growth, and customer satisfaction for the entire organization. The Cognitive Workbench grid is an interactive system designed for end-users to view, understand, and manage the recommendations and actions created by cognitive skills within the innovative platform. The CWB is a personalized inbox that proactively engages users with prioritized, personalized, context-aware recommendations and helps such users to take action directly. Cognitive Workbench plays an important role in self-driving enterprises and helps to increase the speed and the quality of decisions taken by an organization. It offers a whole new way to make decisions with data by providing personalized, time-sensitive, contextual recommendations. By combining AI with a real-time understanding of a performance (e.g., business, sport-related, etc.), the CWB automatically identifies and prioritizes future opportunities (and risks) and makes recommendations about the best course of action An example is a procurement planner, in which a user of procurement skill recommendations for the raw material expedites and defers along with the details such as impact amount and recommended new dates. The planner can then view more details of each recommendation along with the related information, override the system recommended values, or accept the recommendation as is. Once the user accepts the modified or unmodified recommendation, the Skill will automatically update the underline purchasing system using the new values from the recommendation. Decision makers can explore recommendations and evaluate trade-offs with powerful analytics and take actions right from within the CAP.

As an example, the self-driving capabilities of the CAP will transform the way demand planners work and enables making decisions at the same pace as the market requires it. The CAP enables planners to make decisions daily about forecasting of new products or about the sell-through due to promotions. The CAP can create a synchronous ecosystem that connects the end-to-end supply chain to a consumer-driven supply network, using automated decisions and sharing a single version of consumer demand in order to synchronize demand and supply across the business in real time. An example is the procurement planner example above. Using business rules in CAP, several recommendations can be automated without user intervention of accepting or modifying the recommendation. For example, a business rule such as "If the order amount is less than $5000 and expedite date is greater than 5 days, then update PO" will automatically update the PO in the purchasing systems without user intervention. The recommendation will still show up in the user CWB but will be marked as Closed.

Figure 8:
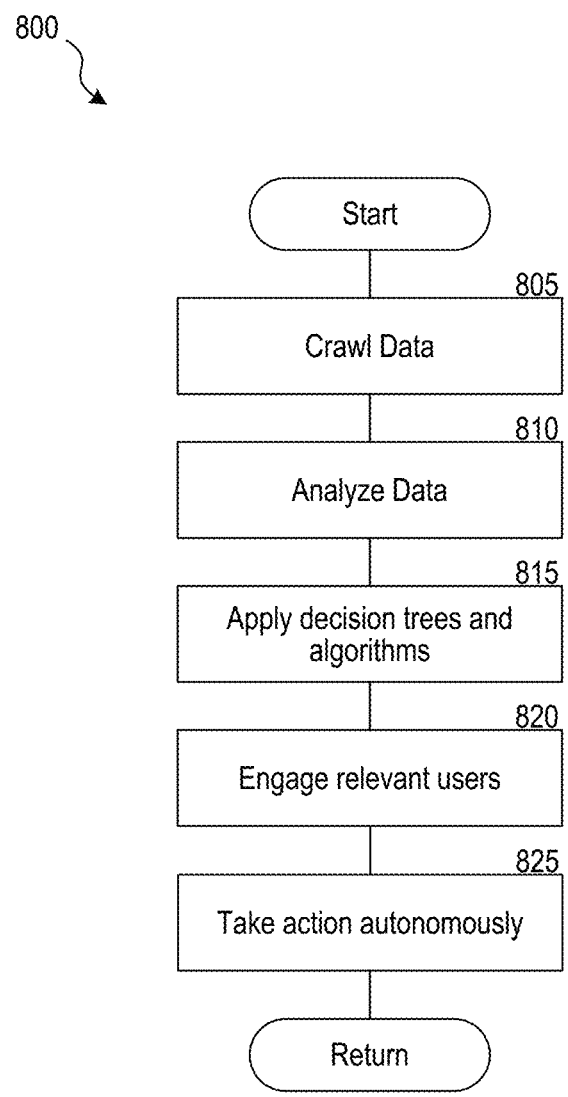
FIG. 8 is a flow diagram of a process for generating a self-driven business or organization using the CAP, consistent with various embodiments.

FIG. 8 is a flow diagram of a process for generating a self-driven business or operation using the CAP, consistent with various embodiments. In some embodiments, the process may be implemented in the environment 100 of FIG. 1 and using the server 150. At block 805, the server 150 crawls the enterprise or organization systems (any of on-premise, external and cloud-based enterprise systems), in real-time, obtain the data, and generate a CDL. At block 810, the server 150 analyses the data in the CDL to detect risk (e.g., business) and opportunities. At block 815, the server 150 applies decision trees and algorithms to the data in CDL to recommend the best course of action. An example is the touchless forecasting example described above. At block 820, the server 150 receives approval of an action from one or more users. At block 825, the data processing engine proceeds with the taking the action autonomously, and writes any data/instructions regarding the action taken back to the transactional (e.g., enterprise) systems. In some embodiments, the server 150 can skip block 820 and autonomously execute the recommended action (instead of waiting for an approval from the user) based on a learning from prior approvals received from the user for similar recommendations.

In some embodiments, the CWB quantifies the impact of each decision. For example, cost, revenue uplift, and operational changes are automatically forecasted and measured using embedded algorithms. Exceptions and anomalies are automatically flagged and prioritized by impact and relevant stakeholders are alerted proactively. The skills continuously monitor the opportunities and risks and generate recommendations for the decision makers. The recommendations are prioritized based on a specified criterion, e.g., business impact. The decision makers can evaluate various recommendations, understand the impact of each recommendation, and act accordingly.

In addition, actions such as adjusting the demand forecast, balancing inventory, or sales plan, can be taken autonomously and operationalized across different transactional systems. It should be appreciated that CAP is a generic platform and not limited to a specific domain such as supply chain. Users can bring any data to the CAP platform and then create the logic of generating the recommendation or automating a decision process. While examples herein may be regarding the supply chain, it should be appreciated that the CAP can be used for any domain. For example, it can be used for driving better marketing spend, running trade promotions, etc. Users experience the CWB where and how they work, on mobile or desktop through natural language voice and search interfaces, and visual analytics.

The CAP can learn from previous decisions and actions taken by a user and/or the system. In addition to augmenting decision-making with AI, the CWB creates an audit trail, e.g., a unique record of how decisions are made within the organization. An example of an augmented decision includes providing details on how the system reached to the conclusion, which resulted in a specific recommendation, list of AI algorithms used for selecting the most optimal recommendation, and list of analytics considered as part of the recommendation generation process. An audit trail will contain the list of the steps that are taken once the recommendations are created, along with the timestamp of each action, of when the recommendation is generated. For example, a raw material expedite recommendation audit trail will show the time the recommendation is created, when it was displayed to the user, any override values but the users, details of user action such as accepted, rejected, modified along with the reason codes, and then the timestamp when the user action propagated to the underline purchasing system. The metrics and recommendations that flow into a decision, actions taken (both augmented and autonomous), and the outcome of those actions are stored in a log. The AI algorithms use this data to learn, e.g., by recognizing patterns, how humans make decisions across the entire organization and feed this learning back into the system, enabling closed-loop and continuous improvement.

Figure 9:
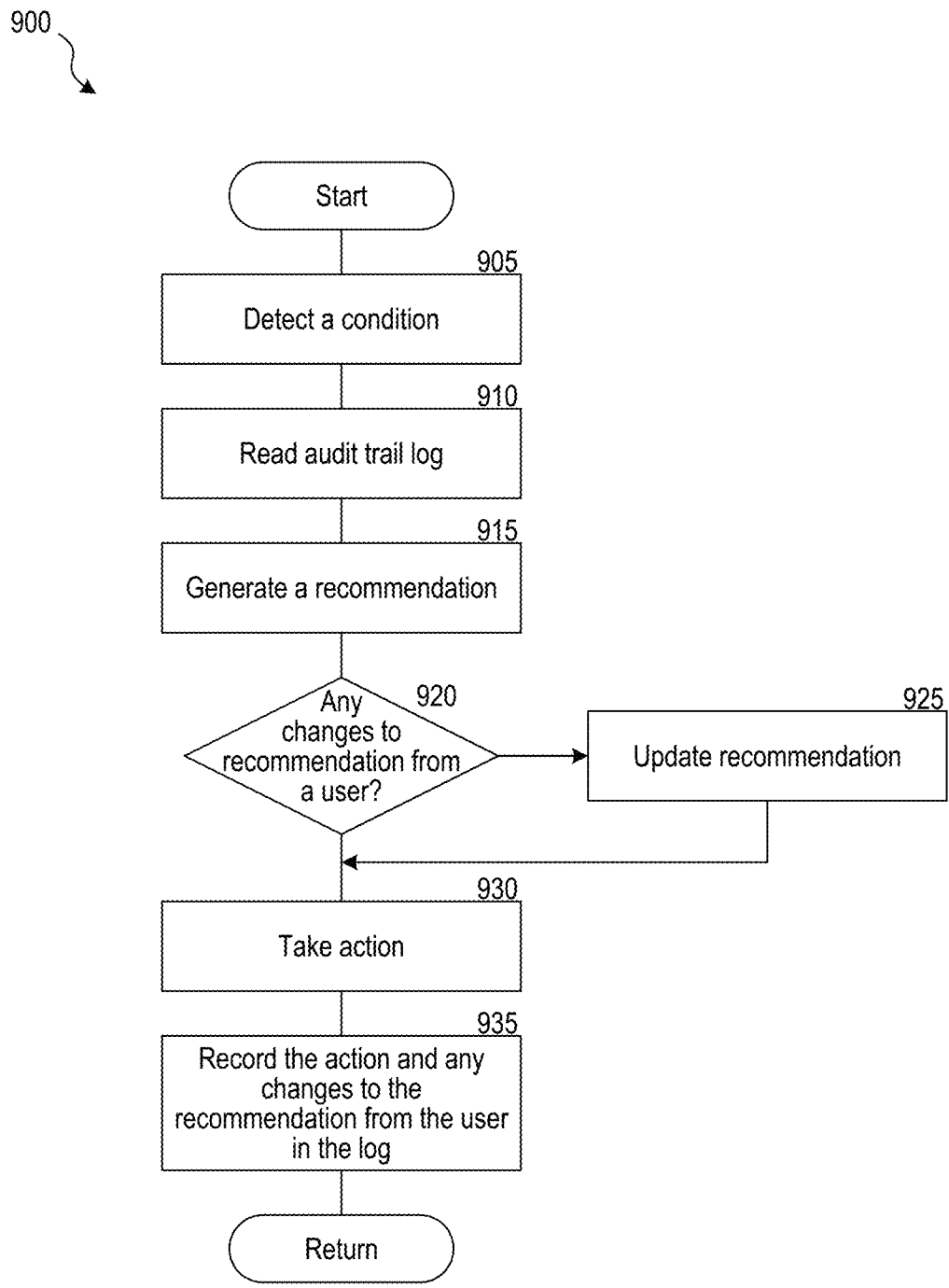
FIG. 9 is a flow diagram of a process for learning from the decisions for the CAP, consistent with various embodiments.

FIG. 9 is a flow diagram of a process for learning from the decisions for the CAP, consistent with various embodiments. The process 900 can be implemented in the environment 100 of FIG. 1. At block 905, the server 150 detects a specified condition in the CDL, e.g., data indicative of a business condition such as supply shortage of a particular product of an organization. The server 150 reports the condition to a user, e.g., generates an alert or a notification in the CWB.

At block 910, the server 150 reads the audit trail log to find any previous decisions and actions taken by the user or the CAP.

At block 915, the server 150 generates a recommendation to address the specified condition. The server 150 can use AI and ML algorithms to generate the recommendations. The server 150 also analyzes the previous decisions and actions taken by the CAP or the user to solve a similar condition in generating the recommendation In some embodiments, if the user had modified a previous recommendation made by the server 150, the server 150 evaluates a first outcome of the action taken by the user based on the changed recommendation and a second outcome of the action had the recommendation made by the server 150 been accepted. The server 150 compares both the outcomes and generates the current recommendation based on the outcome that was better. If the first outcome was better than the second outcome, then the server 150 generates the current recommendation based on the action parameters changed by the user. On the other hand, if the second outcome was better than the first outcome, the server 150 ignores the changes made by the user and generates the recommendation based on the server-generated recommendation. For example, consider that the server 150 had previously detected a demand forecast condition, which indicated that there may be a shortage of a specified product in the market in the future. Based on the analysis of various data in the CDL and using AI and ML techniques, the server 150 had generated a recommendation to increase the demand forecast for the product by 1,500 units. A user, e.g., a person entrusted with taking care of supply demand issues, changes the forecast to 1,200 units and enters a reason for decreasing the forecast. In some embodiments, the server 150 provides various reason codes that are representative of specific reasons. In some embodiments, the user can enter the reason in a free text form. The server 150 takes the action based on the user recommendation, e.g., sends an order request to a manufacturing facility to manufacture 1,200 units.

The server 150 measures the outcome of the action taken by the user (1,200 units) and the outcome of the action had the system generated recommendation (1,500 units) been accepted by the user. For example, the server 150 determines, e.g., from the CDL, that the actual demand was for 1,600 units, and therefore, the server-recommended demand forecast was closer to the actual demand than the user-based recommendation and that an opportunity for additional revenue was missed. The server 150 analyzes the previous decisions, reasons for changing the decisions, if any, previous actions taken, outcome of the previous actions, and generates the recommendation based on the analysis. That is, the server 150 uses the learning from the previous actions in generating the current recommendation. With time, as more and more actions are taken, the CAP can become more and more intelligent and generate more accurate recommendations.

At block 920, the server 150 determines if the user made any changes to the recommendation. If the user made any changes to the recommendation, at block 925, the server 150 updates the recommendation based on the user input.

At block 930, the server 150 takes the action based on the recommendation. For example, if the action is to increase the forecast demand of a specified product, the server 150 can send an order request to a manufacturing facility associated with the enterprise to manufacture a specified number of the specified product within a specified time.

At block 935, the server 150 records the action taken, any changes made by the user to the recommendation along with the reason for changing to the log. The server 150 uses this log for learning from the prior decisions to make recommendations and take actions autonomously.

Figure 10:
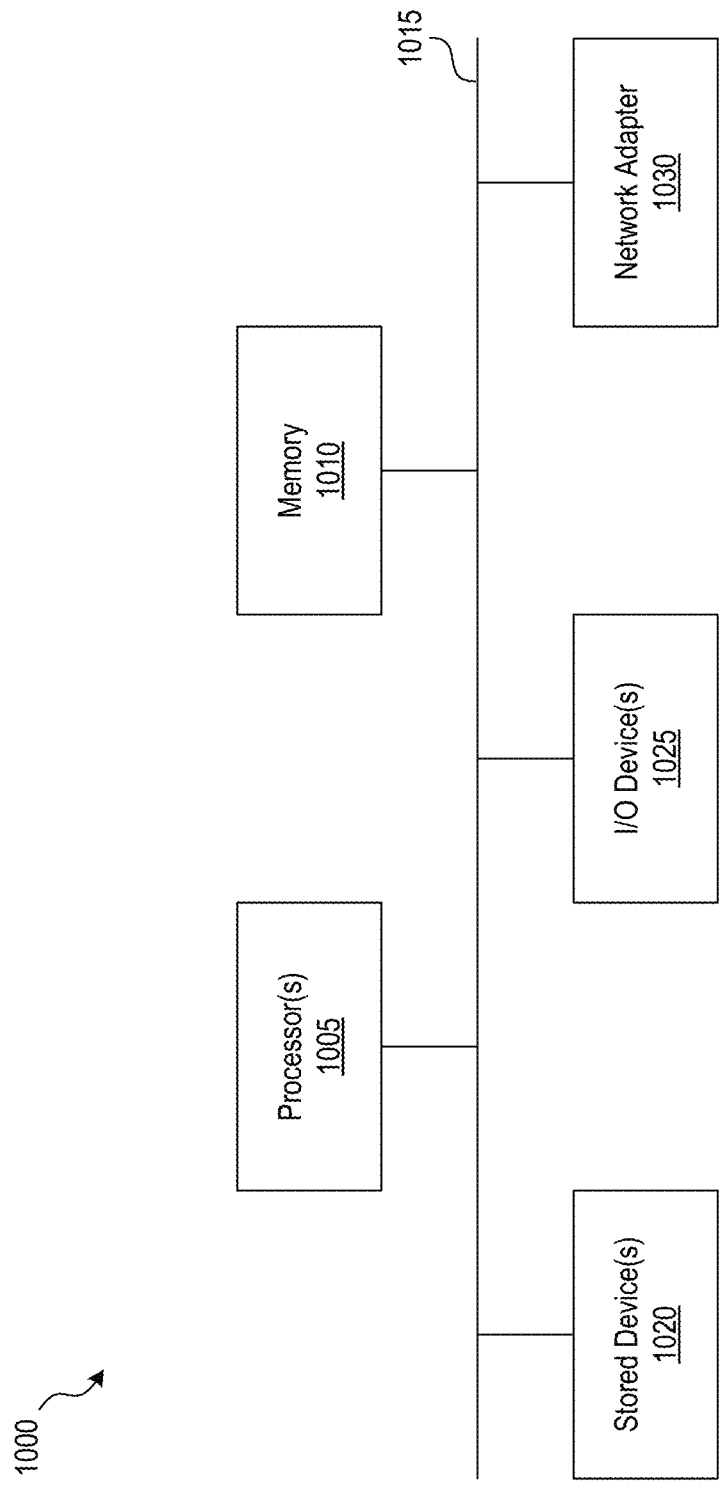
FIG. 10 is a block diagram of a computer system as may be used to implement features of some embodiments of the disclosed technology.

With this unique learning dataset, the CAP can:
Forecast the likely economic impact of a decision based on similar past decisions and key metrics,
Measure the cost of a decision by monitoring the time it takes to act and complexity of the process
Measure overall decision efficiency and effectiveness
Improve the accuracy of recommendations
Automate routine knowledge-based tasks FIG. 10 is a block diagram of a computer system as may be used to implement features of some embodiments of the disclosed technology. The computing system 1000 may be used to implement any of the entities, components, modules, interfaces, or services depicted in the foregoing figures (and in this specification). The computing system 1000 may include one or more central processing units ("processors") 1005, memory 1010, input/output devices 1025 (e.g., keyboard and pointing devices, display devices), storage devices 1020 (e.g., disk drives), and network adapters 1030 (e.g., network interfaces) that are connected to an interconnect 1015. The interconnect 1015 is illustrated as an abstraction that represents any one or more separate physical buses, point to point connections, or both connected by appropriate bridges, adapters, or controllers. The interconnect 1015, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1010 and storage devices 1020 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1010 can be implemented as software and/or firmware to program the processor(s) 1005 to carry out actions described above. In some embodiments, such software or firmware may be initially provided to the processing system 1000 by downloading it from a remote system through the computing system 1000 (e.g., via network adapter 1030).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

An Exemplary Embodiment

Figure 11A:
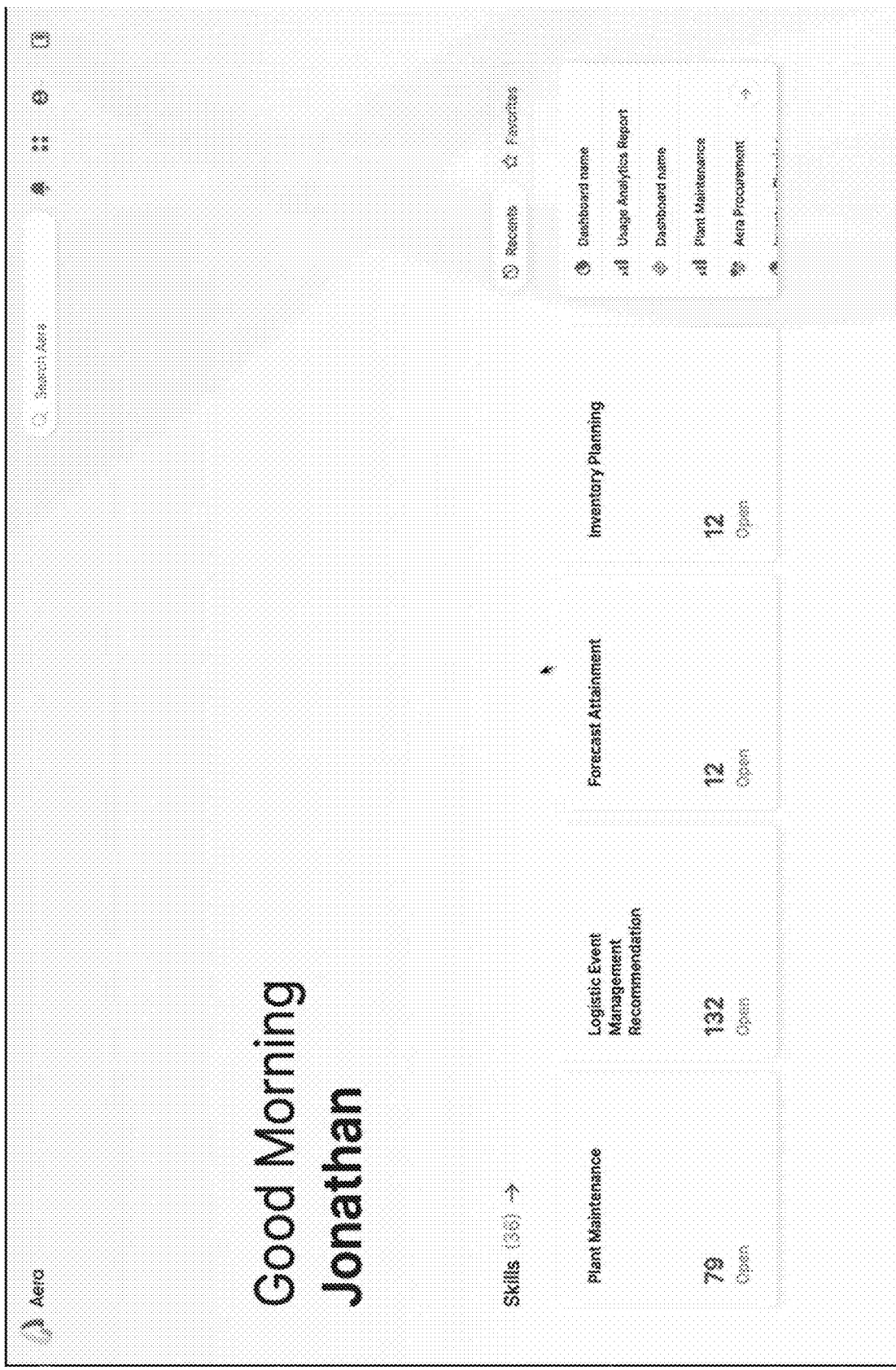
FIG. 11A is a sample screenshot of a GUI homepage, consistent with various embodiments.
Figure 11B:
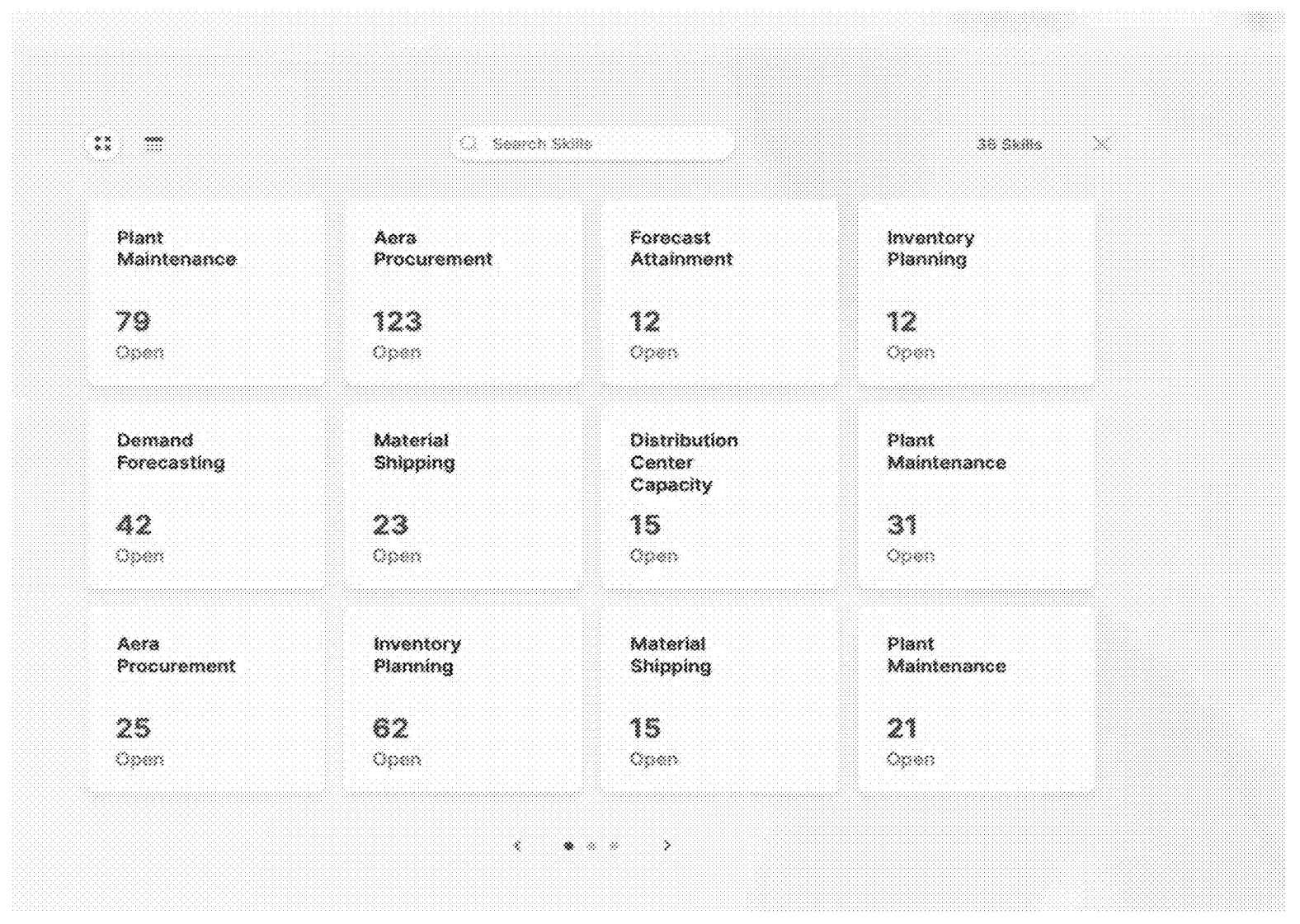
Figure 11C:
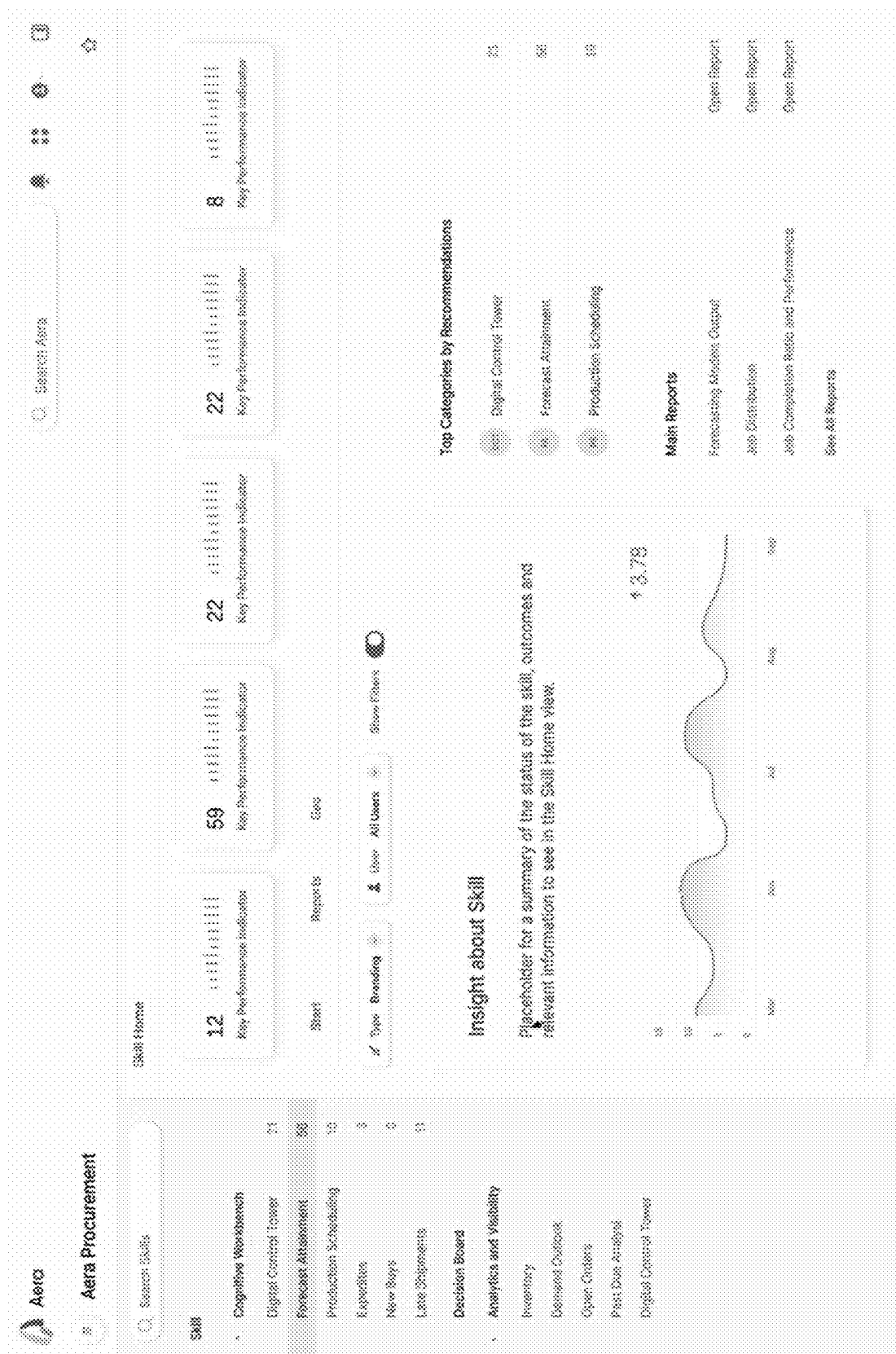
FIG. 11C is a sample GUI displaying a procurement details page consistent with various embodiments.

An embodiment can be understood with reference to FIGS. 11A-C. The homepage GUI shows skills as the main component within the page, and all the other components are packaged inside skill navigation. FIG. 11A is a sample GUI homepage that depicts skills, which were generated by the CAP, as tiles on the bottom left of the screen. The skills are Plant Maintenance, Logistic Event Management Recommendation, Forecast Attainment, and Inventory Planning. A total of 36 skills are accessible from the GUI. Further, the sample GUI offers links to other functionalities such as Usage Analytics Report, Plant Maintenance, and Aera Procurement. Also, the GUI presents buttons that allows the user to view the Recent skills looked at or the Favorites of the skills. Continuing with the example in FIG. 11A, FIG. 11B is a sample GUI that depicts a grid of 12 of the 36 skills tiles. The GUI allows the user to toggle to other pages of the 36 skills for viewing, as the 36 skills tiles do not fit on one page. Continuing with the example in FIG. 11A and FIG. 11B, FIG. 11C is a sample GUI displaying a details page after the Aera Procurement tile has been selected. Links to other skills are available on the left-hand side column. Further to the right is the Skill Home. Key Performance Indicators of the given skill are displayed in separate tiles. Insight about the skill, such as summary of the status of the skill, outcomes, and relevant information is presented numerically and in graph form. Top Categories by Recommendation, such as for example Digital Control Tower, Forecast Attainment, and Production Scheduling, are shown. A linkable list of Main Reports is displayed, such as Forecasting Models Output, Job Distribution, and Job Completion Ratio and Performance.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A network-accessible platform, comprising:
    a memory configured to store non-transitory computer readable instructions; and
    a processor communicatively coupled to the memory, wherein the processor, when executing the non-transitory computer readable instructions, is configured to:
        crawl data in a transaction system using at least one data crawler run with multiple connectors in a cluster,
        reducing network bandwidth consumed by compressing the at least one data crawler;
        process the crawled data using at least one data processing engine configured to transform the crawled data;
        receive the transformed crawled data into a cognitive data layer (CDL), wherein the CDL is configured to index the transformed crawled data, and wherein the transformed crawled data in the CDL is searchable using a natural language voice interface;
        generate a knowledge graph from the transformed crawled data, wherein the knowledge graph is used to enhance natural language search results;
        analyze the transformed crawled data in the CDL;
        based on the analysis of the transformed crawled data in the CDL, detect at least one specified condition in the CDL;
        report the at least one specified condition;
        analyze an audit trail log, wherein the audit trail log comprises a list of artificial intelligence algorithms used for selecting a recommendation; and
        based on the analysis of the audit trail log, generate at least one recommendation to address the at least one specified condition;
        provide a drag and drop interface and a library of pre-defined visual constructs for building one or more skills; and
        build, using a cognitive development kit, a specific skill application on top of a cognitive operating system.

2. The platform of claim 1, wherein previous decisions by at least one user and the platform comprises at least one modification to a previous recommendation made by the platform.

3. The platform of claim 2, the processor further configured to: compare an outcome of the at least one modification of the previous recommendation to an outcome of the previous recommendation.

4. The platform of claim 3, wherein the comparison comprises evaluating the outcome of the at least one modification and the outcome of the previous recommendation.

5. The platform of claim 1, wherein previous decisions by at least one user and the platform comprises at least one modification to a previous recommendation made by the at least one user.

6. The platform of claim 1, wherein the data comprises at least one of: internal data of an organization and external data of the organization, and
wherein the data is encrypted using secure socket layer technology.

7. The platform of claim 6, wherein the data crawler is programmed to automatically discover and extract the internal data of the organization.

8. The platform of claim 1, wherein transforming the crawled data comprises at least one of: de-duping the crawled data and linking the crawled data.

9. The platform of claim 1, wherein the cognitive data layer generates at least one knowledge graph of the crawled data.

10. The platform of claim 1, wherein the at least one specified condition is a supply shortage of a product.

11. The platform of claim 10, the processor further configured analyze previous decisions in response to the supply shortage of the product; to:
compare the previous decisions to an actual demand of the product;
identify a previous decision that forecasted supply most accurately compared to the actual demand; and
based on the previous decision that was most accurate to the actual demand, generate the recommendation to address the supply shortage of the product.

12. The platform of claim 1, the processor further configured to:
receive at least one change from at least one user to the generated recommendation; and
save the at least one change in a previous decisions database.

13. A method for analyzing data in a cognitive data platform, comprising:
crawling data in a transaction system using at least one data crawler run with multiple connectors in a cluster,
reducing network bandwidth consumed by compressing the at least one data crawler;
processing the crawled data using at least one data processing engine configured to transform the crawled data;
receiving the transformed crawled data into a cognitive data layer (CDL), wherein the CDL is configured to index the transformed crawled data, and wherein the transformed crawled data in the CDL is searchable using a natural language voice interface;
generating a knowledge graph from the transformed crawled data, wherein the knowledge graph is used to enhance natural language search results;
analyzing the transformed crawled data in the CDL;
based on the analysis of the transformed crawled data in the CDL, detecting at least one specified condition in the CDL;
reporting the at least one specified condition;
analyzing an audit trail log, wherein the audit trail log comprises a list of artificial intelligence algorithms used for selecting a recommendation; and
based on the analysis of the audit trail log, generating at least one recommendation to address the at least one specified condition;
providing a drag and drop interface and a library of pre-defined visual constructs for building one or more skills; and
building, using a cognitive development kit, a specific skill application on top of a cognitive operating system.

14. The method of claim 13, wherein the data crawler is programmed to automatically discover and extract internal data of an organization.

15. The method of claim 13, wherein transforming the crawled data comprises at least one of: de-duping the crawled data and linking the crawled data.

16. The method of claim 13, wherein the at least one specified condition is a supply shortage of a product.

17. The method of claim 16, further comprising comparing at least one previous decision made in response to the supply shortage of the product to an actual demand of the product.

18. The method of claim 16, further comprising identifying at least one accurate previous decision made in response to the supply shortage of the product, wherein the at least one accurate previous decision accurately forecasted an actual demand of the product.

19. The method of claim 13, further comprising displaying at least one graphical user interface with the at least one specified condition and the at least one recommendation.

20. A non-transitory computer-readable media storing computer executable instructions that when executed cause a computing system to perform a method for analyzing data in a cognitive data platform comprising:
crawling data in a transaction system using at least one data crawler run with multiple connectors in a cluster;
reducing network bandwidth consumed by compressing the at least one data crawler;
processing the crawled data using at least one data processing engine configured to transform the crawled data;
receiving the transformed crawled data into a cognitive data layer (CDL), wherein the CDL is configured to index the transformed crawled data, and wherein the transformed crawled data in the CDM is searchable using a natural language voice interface;
generating a knowledge graph from the transformed crawled data, wherein the knowledge graph is used to enhance natural language search results;
analyzing the transformed crawled data in the CDL;
based on the analysis of the transformed crawled data in the CDL, detecting at least one specified condition in the CDL, wherein the at least one specified condition is a supply shortage of at least one product;
reporting the at least one specified condition;
analyzing an audit trail log, wherein the audit trail log comprises a list of artificial intelligence algorithms used for selecting a recommendation;
comparing previous decisions to historical demand of the product;
identifying at least one accurate previous decision, wherein the at least one accurate previous decision accurately forecasted demand of the product;
based on the analysis of the audit trail and the at least one accurate previous decision, generating at least one recommendation to address the at least one specified condition;
providing a drag and drop interface and a library of pre-defined visual constructs for building one or more skills; and
building, using a cognitive development kit, a specific skill application on top of a cognitive operating system.

* * * * *